(12) United States Patent
Smith et al.

(10) Patent No.: US 6,636,697 B2
(45) Date of Patent: Oct. 21, 2003

(54) DEPRESSURIZED UNDERWATER ONE-TIME-USE CAMERA WITH SEAL INTEGRITY INDICATOR AND METHOD

(75) Inventors: Stephen J. Smith, Shortsville, NY (US); Craig A. Baker, Marion, NY (US); Wayne E. Stiehler, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/027,291

(22) Filed: Dec. 21, 2001

(65) Prior Publication Data

US 2003/0118334 A1 Jun. 26, 2003

(51) Int. Cl.⁷ .............................................. G03B 17/08
(52) U.S. Cl. .............................. 396/26; 396/27; 396/29
(58) Field of Search ...................... 396/25–29

(56) References Cited

U.S. PATENT DOCUMENTS

| | | |
|---|---|---|
| 2,944,474 A | 7/1960 | Dennis |
| 4,460,534 A | 7/1984 | Boehm et al. |
| 4,763,145 A | 8/1988 | Takamura et al. |
| 4,882,600 A | 11/1989 | Van de Moere |
| 4,999,664 A | 3/1991 | Foust |
| 5,126,772 A | 6/1992 | Albrecht |
| 5,159,366 A | 10/1992 | Gell, Jr. |
| 5,270,761 A | 12/1993 | Kwak |
| 5,274,411 A | 12/1993 | Kwak |
| 5,325,139 A | 6/1994 | Matsumoto |
| 5,339,124 A | 8/1994 | Harms |
| 5,365,302 A | 11/1994 | Kodama |
| 5,508,766 A | 4/1996 | Boyd et al. |
| 5,555,468 A * | 9/1996 | Miura ........................ 396/386 |
| 5,602,604 A | 2/1997 | SanGregory |
| 5,614,795 A | 3/1997 | Kim |
| 5,689,735 A | 11/1997 | Horning et al. |
| 5,729,769 A | 3/1998 | Rydelek |
| 5,737,002 A | 4/1998 | Swanson et al. |
| 5,832,312 A | 11/1998 | Rieger et al. |
| 5,870,632 A | 2/1999 | Ho |
| 5,881,319 A | 3/1999 | Cipolla et al. |
| 5,897,225 A | 4/1999 | Rieger et al. |
| 5,953,543 A * | 9/1999 | Shepper ........................ 396/29 |
| 6,047,131 A | 4/2000 | Smith et al. |
| 6,066,282 A | 5/2000 | Kramer |
| 6,296,796 B1 | 10/2001 | Gordon |
| 2002/0094199 A1 * | 7/2002 | Uchiyama ..................... 396/25 |

FOREIGN PATENT DOCUMENTS

| | | |
|---|---|---|
| EP | 0 865 779 A1 | 9/1998 |
| JP | 06-082893 | 3/1994 |
| JP | 6-294992 | 10/1994 |
| JP | 11-109468 | 4/1999 |
| JP | 11-194414 | 7/1999 |
| JP | 11-194415 | 7/1999 |

OTHER PUBLICATIONS

Concise Encyclopedia of Polymer Science and Engineering, Jacqueline I. Korschwitz, 1990, p. 326, "Engineering Plastics".

* cited by examiner

Primary Examiner—David Gray
(74) Attorney, Agent, or Firm—Robert Luke Walker

(57) ABSTRACT

In a photography method, a partial vacuum is provided within a pressure housing of a camera having an unexposed film unit. The camera is sealed against both air entry and venting, while in the partial vacuum. The camera is kept sealed until the film unit is fully exposed and while sealed, a relative pressure differential between the interior of the camera and an environment external to the camera is continuous indicated. The camera has a housing having an internal cavity water-tightly sealed from the external environment. The internal cavity has an unsubmerged internal pressure, at room temperature, less than air pressure at sea level. The camera has a camera frame assembly disposed in the internal cavity and a seal integrity indicator that provides the continuous indication of the relative pressure differential.

25 Claims, 41 Drawing Sheets

DEPRESSURIZED UNDERWATER ONE-TIME-USE CAMERA WITH SEAL INTEGRITY INDICATOR AND METHOD

CROSS REFERENCE TO RELATED APPLICATIONS

Reference is made to commonly assigned, U.S. patent applications Ser. No. 10/037,159 entitled: UNDERWATER ONE-TIME-USE CAMERA HAVING CAMERA FRAME ASSEMBLY RETAINED IN FRONT HOUSING PART AT UNLOADING, filed Dec. 21, 2001 in the names of Wayne E. Stiehler and Stephen J. Smith; Ser. No. 10/036,723, entitled: TWO-SHOT MOLDED SEAL INTEGRITY INDICATOR, UNDERWATER CAMERA, AND METHOD, filed Dec. 21, 2001 in the names of Stephen J. Smith, Craig A. Baker, and Wayne E. Stiehler; Ser. No. 10/027,287, entitled: CAMERA AND UNDERWATER HOUSING HAVING TWO-SHOT MOLDED KNOB SEAT, filed Dec. 21, 2001 in the names of Stephen J. Smith, Craig A. Baker, and Wayne E. Stiehler; Ser. No. 10/027,379, entitled: UNDERWATER CAMERA HOUSING HAVING SEALED PIVOTABLE SHUTTER ACTUATOR AND METHOD, filed Dec. 21, 2001 in the names of Stephen J. Smith, Craig A. Baker, and Wayne E. Stiehler; Ser. No. 10/027,284, entitled: UNDERWATER CAMERA HAVING VIEWPORTS BEARING ON VIEWFINDER TUNNEL OF FRAME, filed Dec. 21, 2001 in the names of Stephen J. Smith, Wayne E. Stiehler, and Craig A. Baker, Ser. No. 10/027,294, entitled: DUAL ACTION SHUTTER RELEASE WITH THUMBWHEEL BRAKE AND METHODS, filed Dec. 21, 2001 in the names of Wayne E. Stiehler, Stephen J. Smith, and Craig A. Baker, Ser. No. 29/153,013, entitled: UNDERWATER HOUSING ASSEMBLY, filed Dec. 21, 2001 in the names of Stephen J. Smith, Wayne E. Stiehler, Edwin J. Khang, and Jeffrey S. Eng.

FIELD OF THE INVENTION

The invention relates to photography and photographic methods and equipment and more particularly relates to a depressurized underwater one-time-use camera having a seal integrity indicator and related method.

BACKGROUND OF THE INVENTION

Underwater cameras, by their nature, are sealed against entry of water during use. One-time-use underwater cameras are also usable unsubmerged. While used in air, protection from entry of rain, dust, or the like, may also be desirable. Since access is not required for film loading, a one-timeuse camera can be sealed air- and water-tightly during manufacture. This can be problematic if the one-time-use camera is left out in the sun. A sealed camera that is left out in the sun can develop a high internal pressure. This can cause damage to camera components. The water-tight seal may be lost, without any visible distortion of a housing or cover.

One solution to this problem is the use of a housing that can be repeatedly opened and closed. This is comparable to the use of a reusable camera with a housing or cover that is opened at least every time film is loaded or use of a separate underwater housing that is installed only for underwater use. The housing can be opened as necessary to prevent over-pressurization. This solution is not desirable for one-time-use underwater cameras, which are intended for casual use without restrictive procedures.

Japanese patent publication JP 6-294992A, published Oct. 21, 1994, teaches a waterproof camera case that provides a valve that vents air (or other gas) to relieve excess internal pressure. The valve can also be used to evacuate air and add nitrogen at reduced pressure. This approach provides venting to reduce pressure, but adds one or more parts and some complexity. The valve also presents an additional risk of leakage.

U.S. Pat. No. 4,763,145 teaches a camera that adjusts internal air pressures to permit configuration changes such as moving a lens barrel between a wide-angle position and a telephoto position. Space within the camera for expansion and contraction is provided by a movable piston, elastomer member, or the like. A manual valve is optionally provided for venting.

U.S. Pat. No. 5,870,632 teaches a leakage detector which is used with a waterproof casing of a camera that is pressurized to greater than atmospheric pressure. The leak detector indicates if pressurization is decreased due to leakage.

Two shot injection molding is a well-known technique that provides one-piece plastic castings that are made of different materials in different regions of the casting. The different materials are united by codiffusion of adjoining regions of the two different materials. During molding, conditions are selected such that the molecules of the two different regions diffuse together before solidification. The codiffused zones have interpenetrating polymer networks. (This is also referred to as "molecular entanglement".)

A variety of two shot molding techniques are known, such as those disclosed in U.S. Pat. Nos. 6,066,282; 4,460,534; 6,296,796; and 5,737,002. Among these techniques is the use of a hard engineering plastic for one of the regions and a tougher, but softer material such as an elastomer, for another region of the casting. EP 0 865 779 A1 discloses an orifice coupling that has an internal, soft wiper seal formed by two shot injection molding. The use of two shot molding for the housing of an underwater one-time-use camera is disclosed in U.S. Pat. No. 5,832,312.

U.S. Pat. No. 4,999,664 teaches an exposure control that responds automatically to water pressure when submerged.

It would thus be desirable to provide improved camera and method in which an underwater camera remains fully and visibly sealed all during use.

SUMMARY OF THE INVENTION

The invention is defined by the claims. The invention, in broader aspects, provides a photography method, in which a partial vacuum is provided within a pressure housing of a camera having an unexposed film unit. The camera is sealed against both air entry and venting, while in the partial vacuum. The camera is kept sealed until the film unit is fully exposed and while sealed, a relative pressure differential between the interior of the camera and an environment external to the camera is continuous-indicated. The camera has a housing having an internal cavity water-tightly sealed from the external environment. The internal cavity has an unsubmerged internal pressure, at room temperature, less than air pressure at sea level. The camera has a camera frame assembly disposed in the internal cavity and a seal integrity indicator that provides the continuous indication of the relative pressure differential.

It is an advantageous effect of the invention that an improved camera and method are provided, in which an underwater camera remains fully and visibly sealed all during use.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
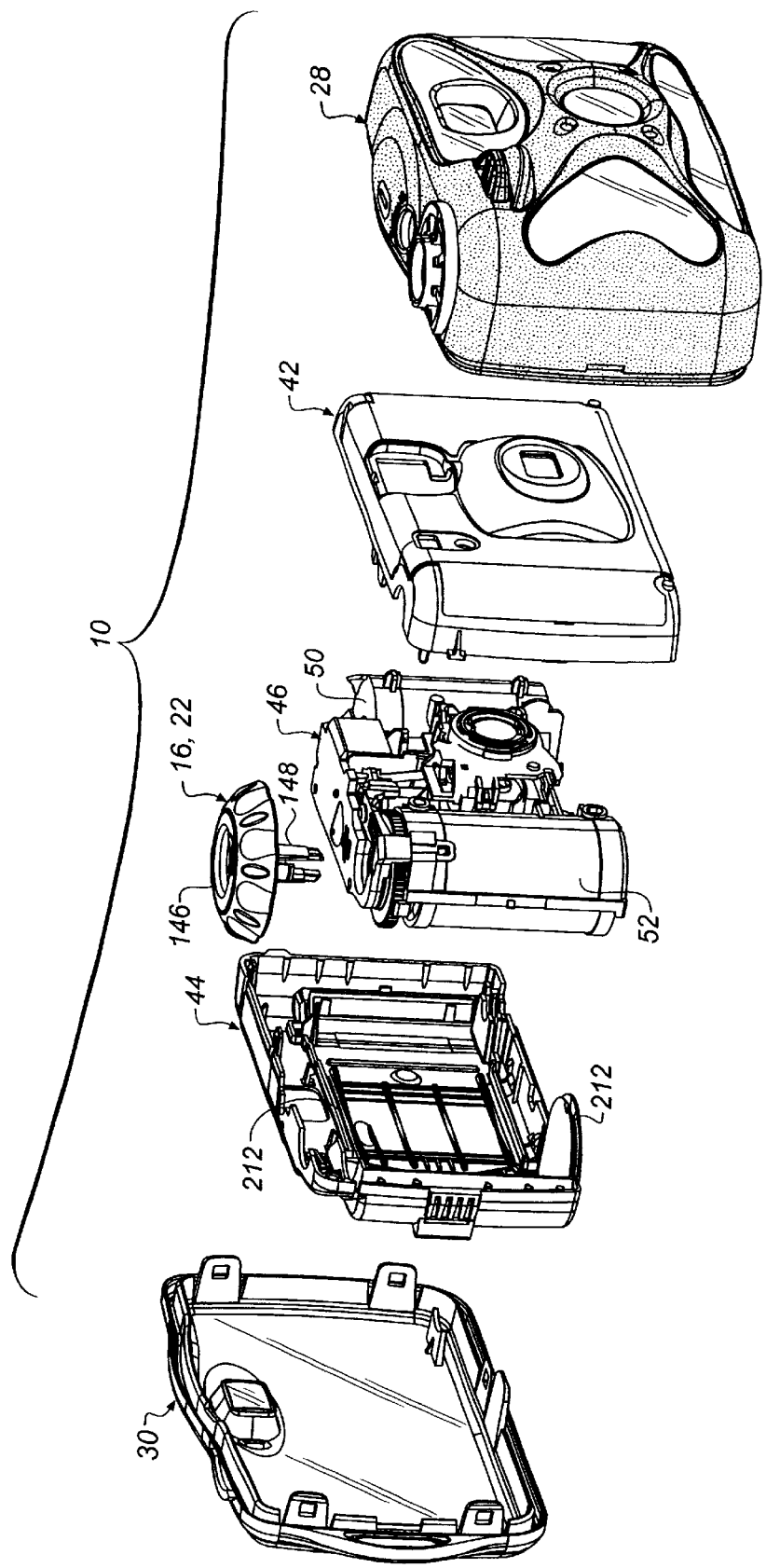
FIG. 1 is a front, partially exploded view of an embodiment of the underwater one-time-use camera.

The invention is generally described herein in reference to a particular embodiments in which the one-time-use camera uses photographic film and combines various features. The invention is not limited to such embodiments. It will be apparent to those of skill in the art that features, that various of the features disclosed can be included or excluded, within the limits defined by the claims and the requirements of a particular use.

For example, the camera can capture images electronically rather than using photographic film or can be a film-electronic hybrid that uses both. The camera can capture video in addition to or instead of still images. The camera can be reusable rather than one-time-use. The housing can be used other kinds of equipment, such as a rangefinder or flash unit.

Referring now to FIGS. 1–10, the camera 10 has a pressure housing 12 and a frame assembly 14 disposed within the housing 12. One or more user controls 16 extend from the outside of the housing 12 to the camera frame assembly 14. The camera frame assembly 14 holds a film unit 18 that stores captured images. In the embodiment shown in FIG. 1, the film unit 18 is a photographic film cartridge 18a and the user controls 16 are a shutter actuator 20 and a winding knob 22 that is wound to advance the photographic film between exposures. In the photographic film-type one-time-use cameras discussed herein, the film unit 18 is a film cartridge 18a, which has a canister 18b and a spool 18c internal to the canister 18b. A filmstrip 18d is joined to the spool 18c and, prior to use extends out of the canister to a prewound film roll 18e.

The housing 12 has two or more parts joined together. In the embodiments shown in the figures, the housing 12 has a first or front housing part 28, having a back opening 29, and a second or rear housing part 30 that are sealed together during use. In these embodiments, the housing 12 divides vertically between the front and rear housing parts 28,30. It will be understood that the housing parts 28,30 can be modified to divide the housing 12 in other ways, such as horizontally, and the housing parts 28,30 can themselves be divisible, if desired. The housing 12 has an inner surface 32 and an outer surface 34 and a passage 36 extending between the surfaces 32,34 for winding knob 22.

The housing 12 has a shell 24 and a facing 26 that is united with the shell 24, that is, in each housing part, the shell 24 and facing 26 are or act like a one-piece structure. The shell 24 is included in both front and rear housing parts 28,30. The facing 26 can be included in both front and rear housing parts 28,30, but in the embodiments disclosed herein, is limited to the front housing part 28.

The facing 26 can cover the entire outer surface 34 of the housing part or parts, or can be limited to regions of the housing 12 where the facing 26 provides a particular function. Alternatively, those and other regions of the housing 12 can be covered, as desired, for artistic effects.

Figure 32:
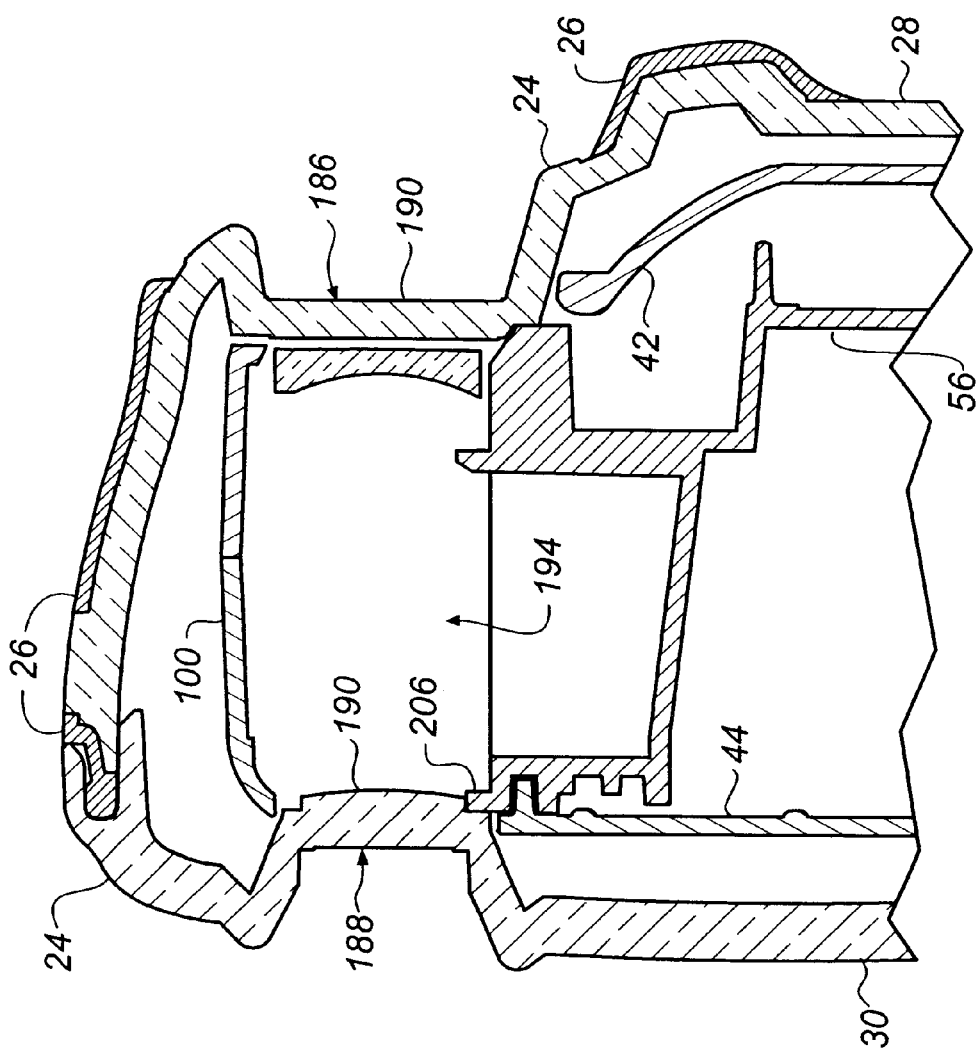
FIG. 32 is a partial cross-sectional view of the camera of FIG. 1 taken substantially along line 32-32 of FIG. 3.
Figure 33:
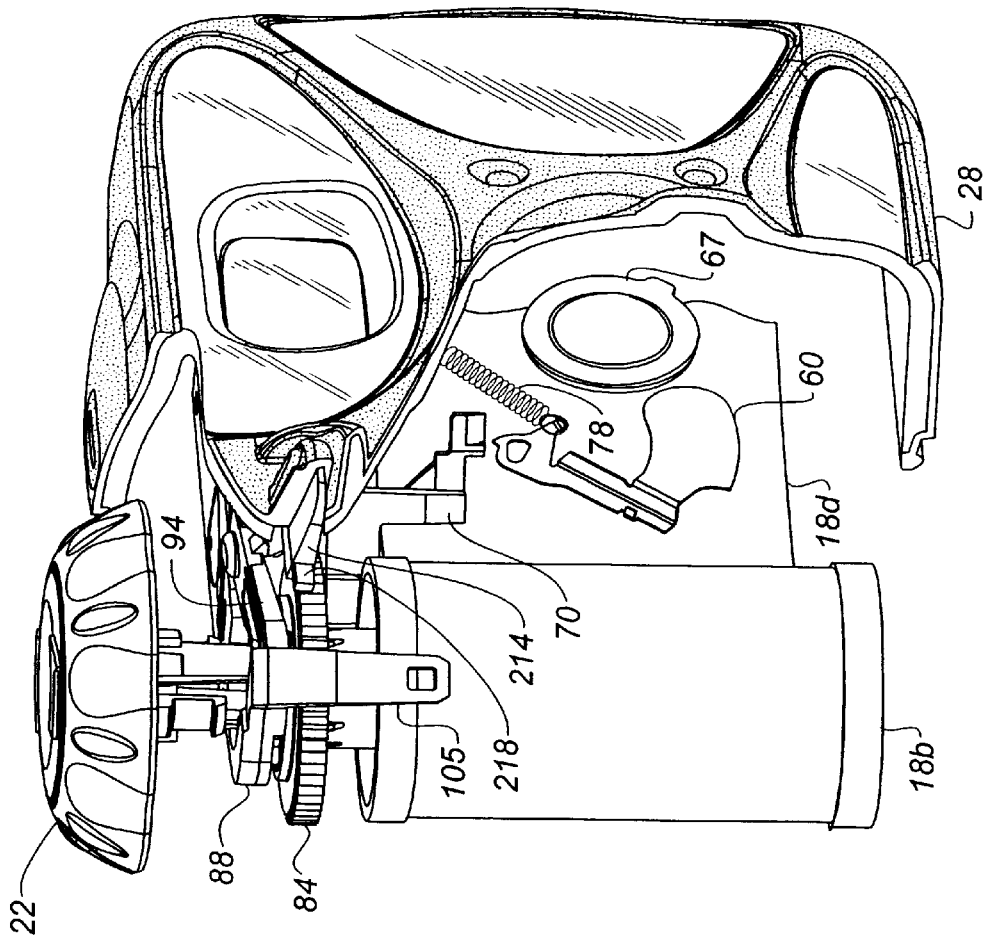
FIG. 33 is a cut-away perspective view of the camera of FIG. 1 with components deleted for clarity. Shown are part of the front housing part, the knob, the film unit, part of the frame, and some other components of the camera frame assembly. The shutter is shown in the open position.
Figure 34:
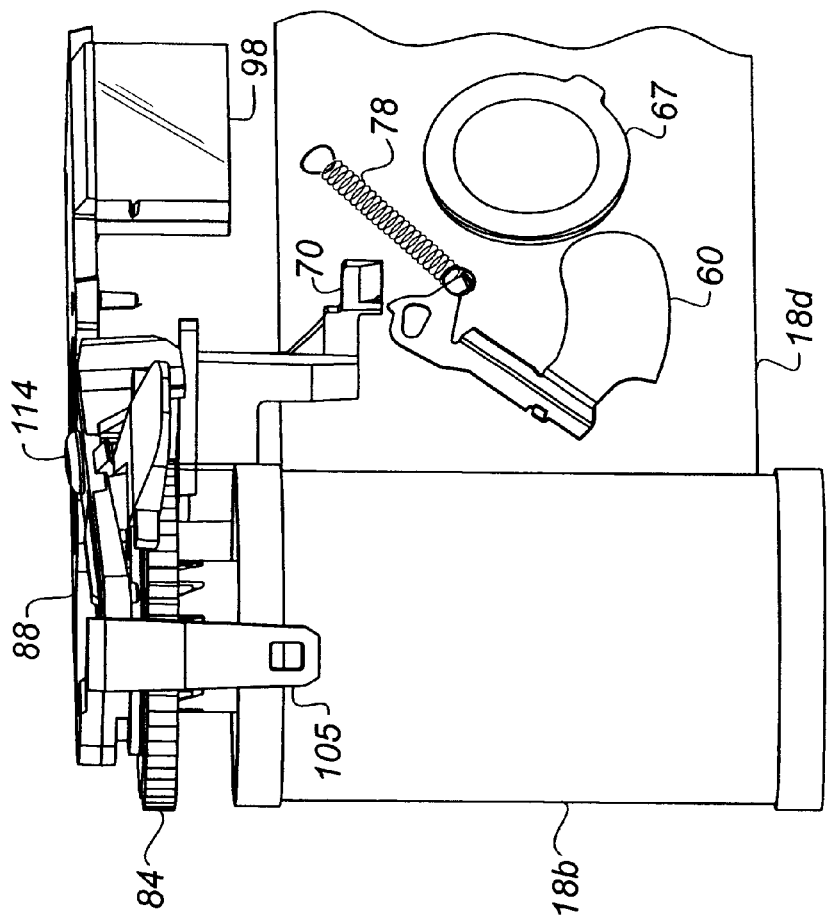
FIG. 34 is a front view corresponding to FIG. 33, but with the front housing part and knob deleted from the figure and with the keeperplate shown. The shutter is shown in the open position.

The facing 26 is relatively soft and the shell 24 is relatively hard. The soft facing 26 can be used to provide a seal between housing parts 28,30. A convenient seal can be provided by configuring the shell 24 in one of the housing parts to have a continuous tongue 38 extending around the edge and in the other housing 12 part to have a matching groove or rabbet 40 configured to overlap the tongue 38. When assembled, the facing 26 is compressed between the tongue 38 and rabbet or groove 40. (This is best seen in FIG. 32) The compressed section of facing takes the place of an O-ring or washer.

The uniting of shell 24 and facing 26 can be provided by bonding one to the other by adhesive or the like. It is preferred that the housing 12 be prepared by a technique commonly referred to as "two shot" or "two pack" injection molding. In two-shot molding, a set of die members (not shown) are initially positioned to define a mold having a first cavity that molds one of two sections of the part to be produced. The cavity is filled with a first moldable material during a first injection shot. One or more of the die members is then moved to define a second cavity that holds the molded product of the first moldable material and is larger than the first cavity. A second injection shot is then made with a second moldable material. The temperature of the mold is maintained such that the first moldable material will melt along the interface with the second moldable material during the molding process, such that the first moldable material maintains its integrity, only being effected along the interface and not washing out as the second moldable material is shot into the mold. The moldable materials are selected such that the two shots of material diffuse together at the interface, before hardening. This effect, described as: codiffusion or molecular entanglement, results in an interface region that is comparable in character to a bulk interpenetrating polymer network.

A housing part produced by two shot molding, is a one-piece plastic casting that has a engineering plastic shell 24 and a softer, preferably elastomer facing 26. The term "engineering plastic" and "elastomer" are each used herein in an ordinary technical sense. For example, a definition is provided in the *Concise Encyclopedia of Polymer Science and Engineering*, J. I. Kroschwitz, ed., John Wiley & Sons, New York, 1990, at page 326:

"Engineering plastics are thermoplastics that maintain dimensional stability and most mechanical properties above 100 degrees C. and below 0 degrees C. This definition encompasses plastics that can be formed into functional parts that can bear loads and withstand abuse in temperature environments commonly experienced by the traditional engineering materials: wood, metals, glass, and ceramics. Generic resins falling within the scope of this definition include acetals, polyamides (nylons), polyimides, polyetherimides, polyesters, polycarbonates, polyethers, polysulfide polymers, polysulfones, blends or alloys of the foregoing resins, and some examples from other resins types".

The same source describes elastomers at page 295:

"Elastomers are derived from natural rubber and synthetic polymers with rubberlike properties. They exhibit both long-range deformability on application of stress and complete recovery on removal."

Examples of specific materials for the shell and facing are polycarbonate/polyurethane or polystyrene/styrene-butadiene.

The shell 24 can be textured by the mold surface to provide a better grip for the user. For clarity, texturing of the surface of shell 24 is only illustrated in some of the figures.

The frame assembly 14 has most of the features of a completed one-time-use camera 10. Exceptions are one or more user controls 16, which are modified so as to the usable from outside the housing 12 and, in a particular embodiment discussed below, retention features that hold the camera frame assembly 14 in the front housing part 28.

The camera frame assembly 14 has a front cover 42 and a rear cover 44. The covers 42,44 are joined together over a frame unit 46. The frame unit 46 and rear cover 44 define a film space 48 including a pair of film chambers 50,52 and an exposure chamber 54 between the film chambers 50,52. The film space 48 is light-tight. It is convenient if light blocking is provided by the frame unit 46 and the rear cover 44. In this case, it is unnecessary for the front cover 42 to provide a light blocking function.

It will be understood, that the various features disclosed herein in the used in combination is not disclosed and can be modified in a manner known to one of skill in the art. For example, a housing 12 and respective cover of the camera frame assembly 14 could be combined in a single part.

The frame unit 46 has a frame 56, which, preferably, is a single plastic casting. The frame 56 includes the film chambers 50,52 and exposure chamber 54. Extending forward from the exposure chamber 54 is a baffle 58. At the forward end of the baffle 58 is a shutter 60 and a lens assembly 62. The lens assembly 62 includes one or more plastic or glass lens elements 64, a lens holder 66, and a diaphragm ring 67. The shutter 60 shown is a single leaf impact-type shutter. As with other components, the shutter 60 can be varied.

The frame unit 46 has a metering lever 68 and a high-energy lever 70, which are operated by cams 72,74 of a sprocket-cam unit 76. One or more biasing springs 78 hold the levers 68,70 against the respective cams 72,74, as needed. The sprocket-cam unit 76 also has a sprocket 80 that extends into the film space 48. Perforations 82 of the filmstrip 18d engage the sprocket 80. The sprocket 80 rotates when the film 18d is advanced by the rotation of a thumbwheel 84.

The sprocket-cam unit 76 has an axle 77 that fits in holes in the frame 56 and in a keeperplate 88 mounted to the upper end of the frame 56. The high-energy lever 70 and the metering lever 68 rotate on posts 90 of the frame 56. A counterwheel 92 is driven by the sprocket-cam unit 76 and counts film exposures. The counterwheel 92 is also mounted on one of the posts 90.

It is convenient to incorporate additional features in the keeperplate 88. In the embodiments shown, the keeperplate 88 is transparent plastic and includes: a shutter release 94, a retainer 96 that holds the counterwheel 92 in place, a viewfinder lens element 98 and an upper wall 100 of the viewfinder 102, and a counterwheel lens 104. A leg 105 of the keeperplate 88 attaches to a holdfast 107 of the frame 56 to hold the keeperplate 88 in position.

Figure 35:
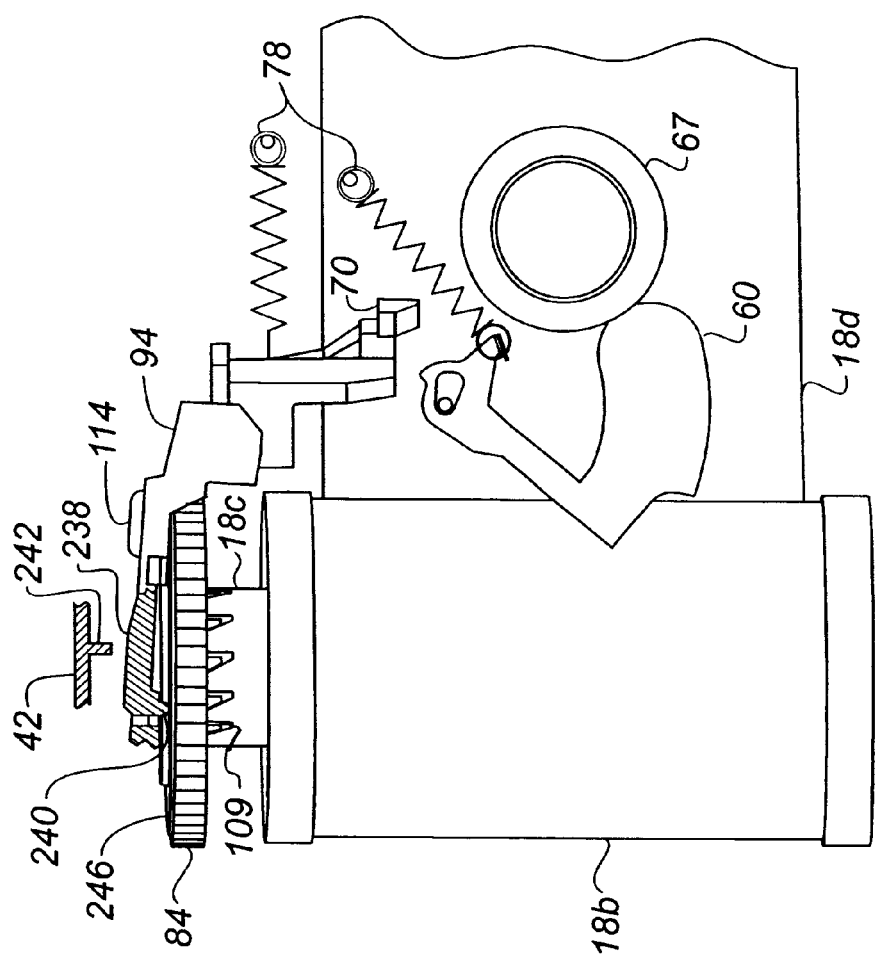
FIG. 35 is a semi-diagrammatical view of the camera of FIG. 1 showing components related to the dual action shutter release and thumbwheel brake. The shutter is shown in the open position.
Figure 36:
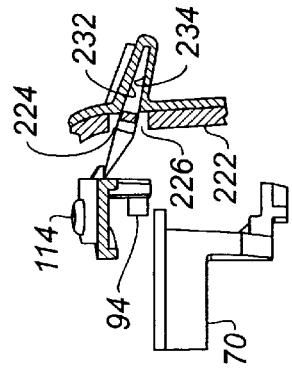
FIG. 36 is a partial front-to-back cross-sectional view of the camera of FIG. 1 with some components deleted for clarity. Shown are a section of the front housing part, a section of the facing, the shutter actuator, the high-energy lever, and the shutter release. The shutter actuator is in an initial orientation and the high energy lever is latched by the shutter release.
Figure 37:
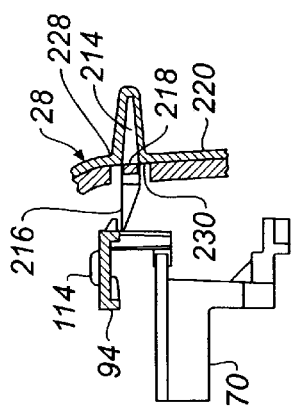
FIG. 37 is the same view as FIG. 36, except the shutter actuator is in pivoted orientation and the high energy lever is released from the shutter release.
Figure 38:
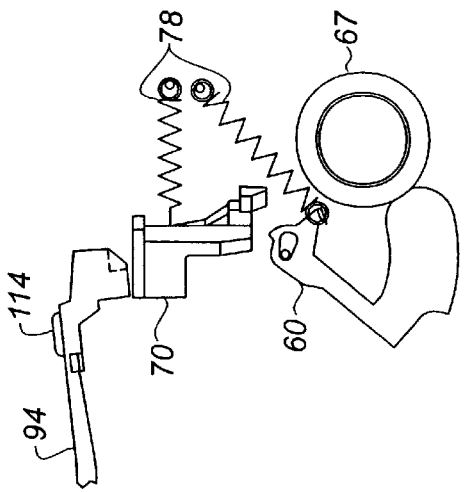
FIG. 38 is a partial right-to-left semi-diagrammatical cross-sectional view of the camera of FIG. 1 with some components deleted for clarity. Shown are the shutter release, the high energy lever, the shutter, the diaphragm ring, and a pair of biasing springs. The shutter actuator is in an initial orientation and the high energy lever is latched by the shutter release.
Figure 39:
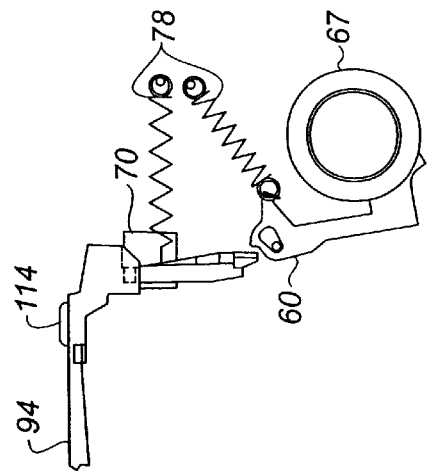
FIG. 39 is the same view as FIG. 38, except that the shutter actuator is in pivoted orientation, the high energy lever is released from the shutter release, and the shutter is in the open position.

The thumbwheel 84 is held between the keeperplate 88 and frame 56 and extends through an opening 106 in the frame 56 into the film cartridge chamber 52. A fitting 109 (shown in FIG. 35) of the thumbwheel 84 mechanically engages the internal spool 18c of the film cartridge 18a. The covers 42,44 have an opening 108 that overlies a socket 110 of the thumbwheel 84. The socket 110 and the end of a shaft of the winding knob 22 engage, causing the thumbwheel 84 to rotate when the knob 22 is wound.

Figure 11:
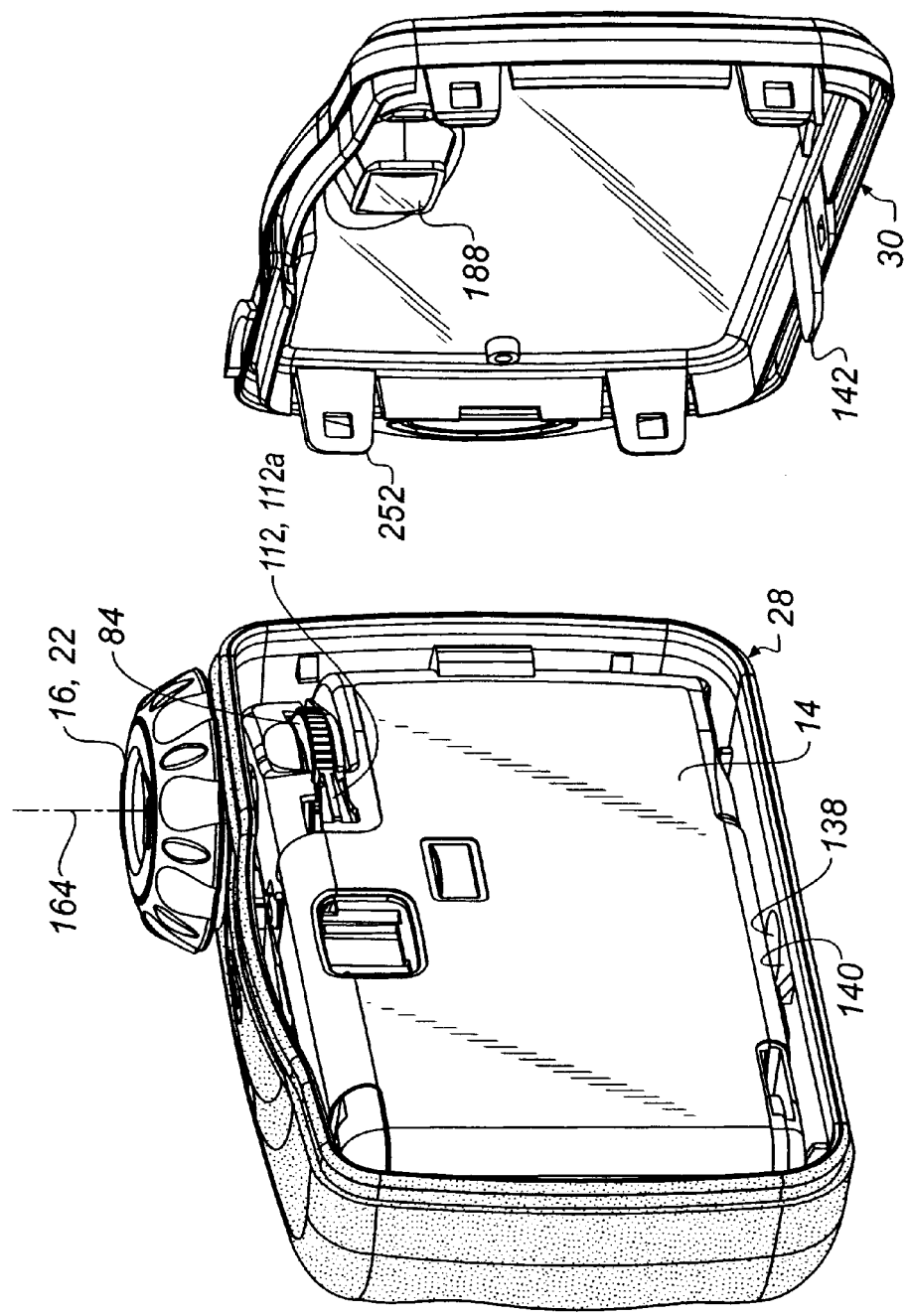
FIG. 11 is a perspective view showing the camera of FIG. 1, with the front housing part, knob, and camera frame assembly detached from the rear housing part.
Figure 12:
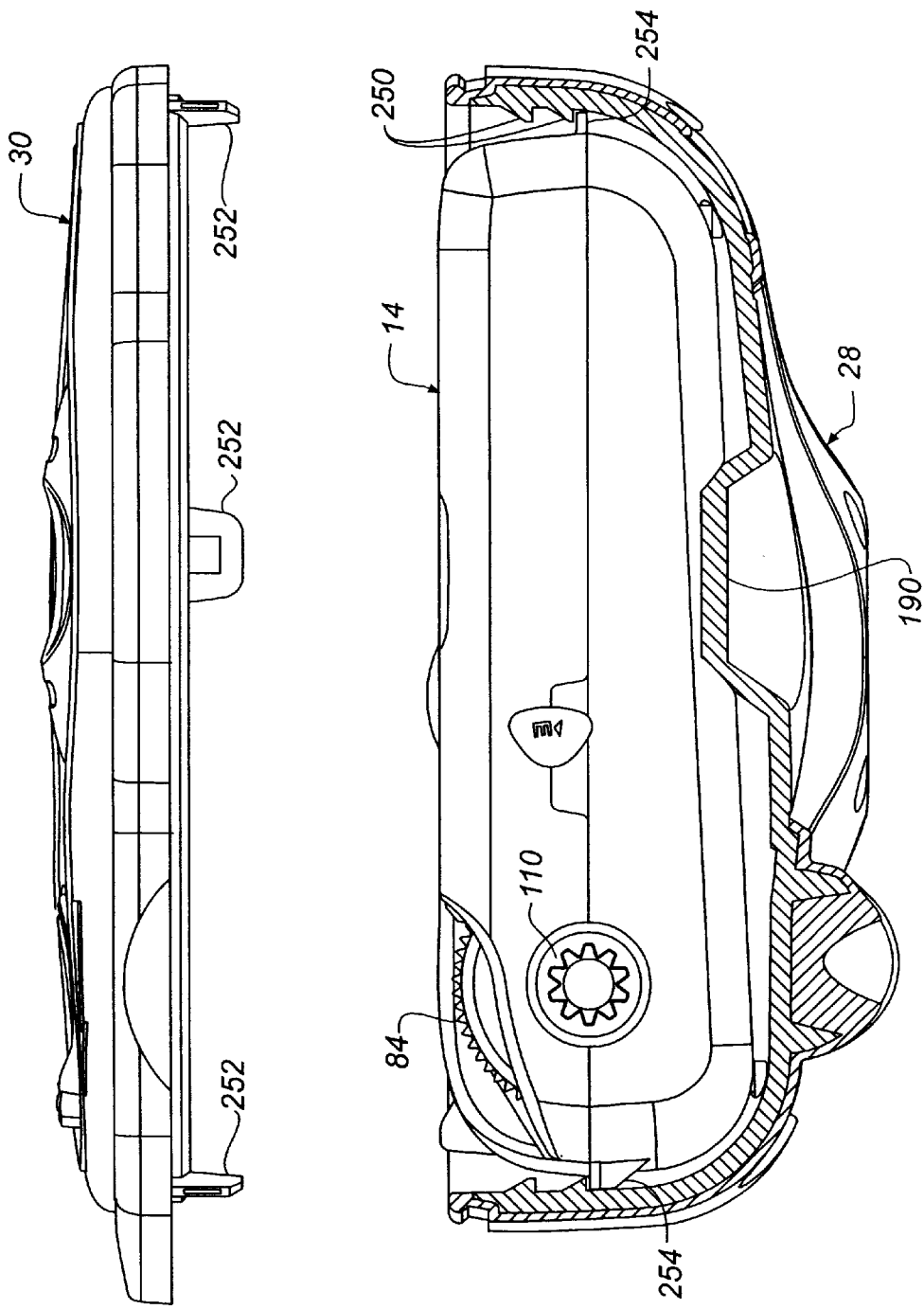
FIG. 12 is a top view of the housing and camera frame assembly of the camera of FIG. 11, following removal of the winding knob. The rear housing part and camera frame assembly are shown in plan view. The rear housing part is detached. The front housing part is shown in cross-section.

Referring to FIG. 11, the thumbwheel 84 is preferably subject to the action of a one-way clutch 112. In the embodiment illustrated, the one-way clutch 112 is an anti-backup lever 112a that engages external teeth 115 of the thumbwheel 84. The anti-backup lever 112a is provided as a resilient arm formed as a part of the rear cover 44. Other anti-backup levers and other types of one-way clutches can also be used.

The thumbwheel 84, in the embodiments shown, is exposed on the outside of the camera frame assembly 14 as is a shutter button 114. The thumbwheel 84 and/or the shutter button 114 can, alternatively, be enclosed by the covers 42,44, except over the socket 110. In an embodiment discussed below, the shutter release 94 includes a shutter button 114, in the form of a raised area that extends upward relative to the remainder of the shutter release 94. The shutter button 114 can be exposed, but is not externally accessible in the illustrated embodiments of underwater one-time-use cameras. The front cover 42 has an opening 116 in the vicinity of the shutter release 94 for a shutter actuator 20. One or more locating features 118 can be provided on the covers 42,44 and housing parts to help guide and maintain placement of the housing parts 28,30.

The camera frame assembly 14 is assembled in the same manner as with other one-time-use cameras 10. Components are mounted to the frame 56. The frame unit 46 is then placed in the front cover 42, a film unit 18 is loaded in the camera 10 and the back cover 44 is attached. The film roll 18e can be formed prior to film loading or after, by winding film 18d out of the canister 18 using an exposed end of a second spool 120 or other winding mechanism.

The completed camera frame assembly 14 is placed in the front housing part 28 and the rear housing part 30 is attached to the front housing part 28. The winding knob 22 is then inserted through the passage 36 and into engagement with the socket 110 of the thumbwheel 84. The winding knob 22 is held in place on the housing 12 by a catch 122. The catch 122 permits the winding knob 22 to be released from the housing 12 and reattached without damage, one or more times. This functionality is intended for recycling, rather than during camera use.

Figure 48:
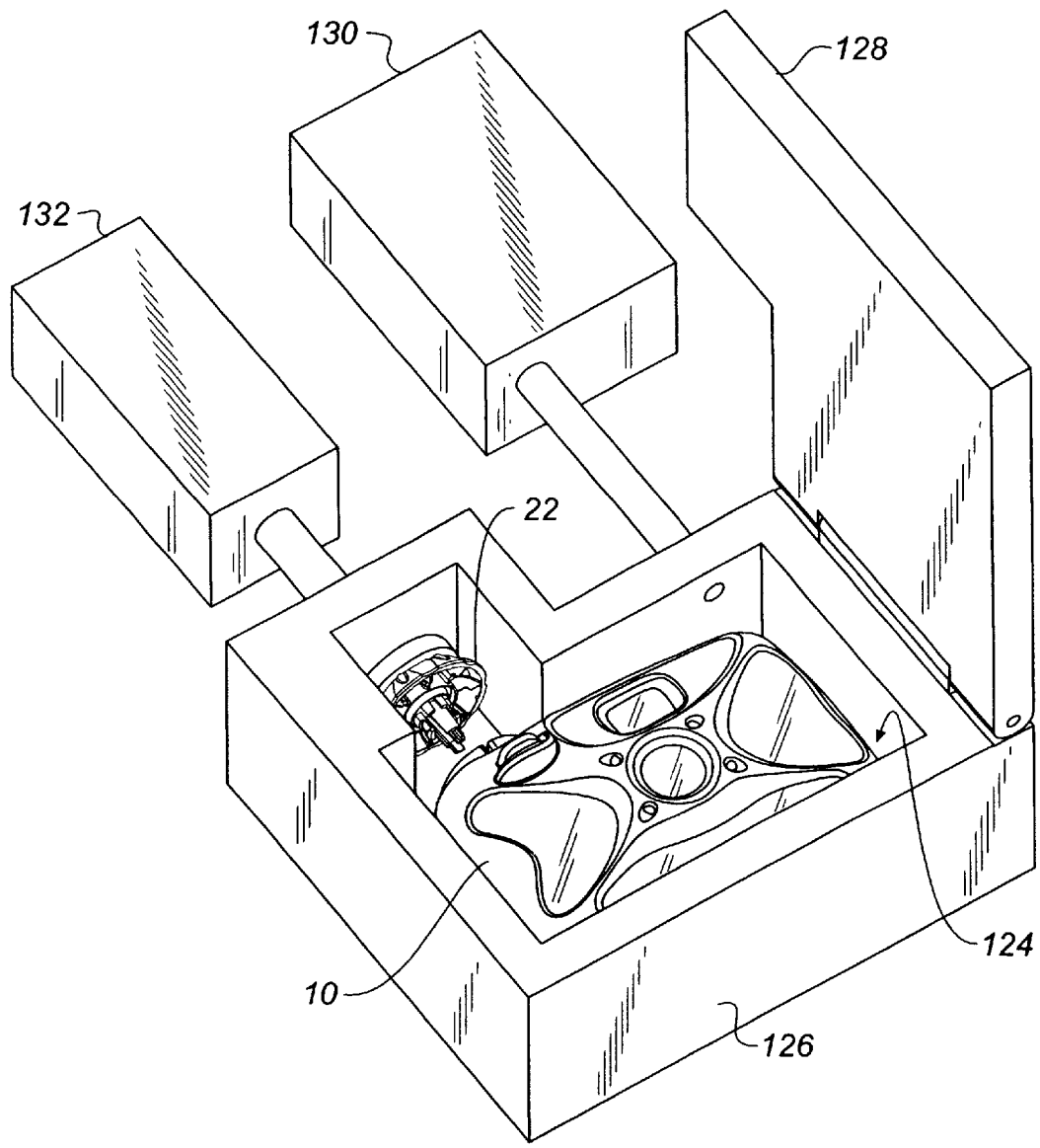
FIG. 48 is a semi-diagrammatical perspective view of an incomplete camera like the camera of FIG. 1 and assembly equipment. The enclosure is shown with the hatch open.
Figure 49:
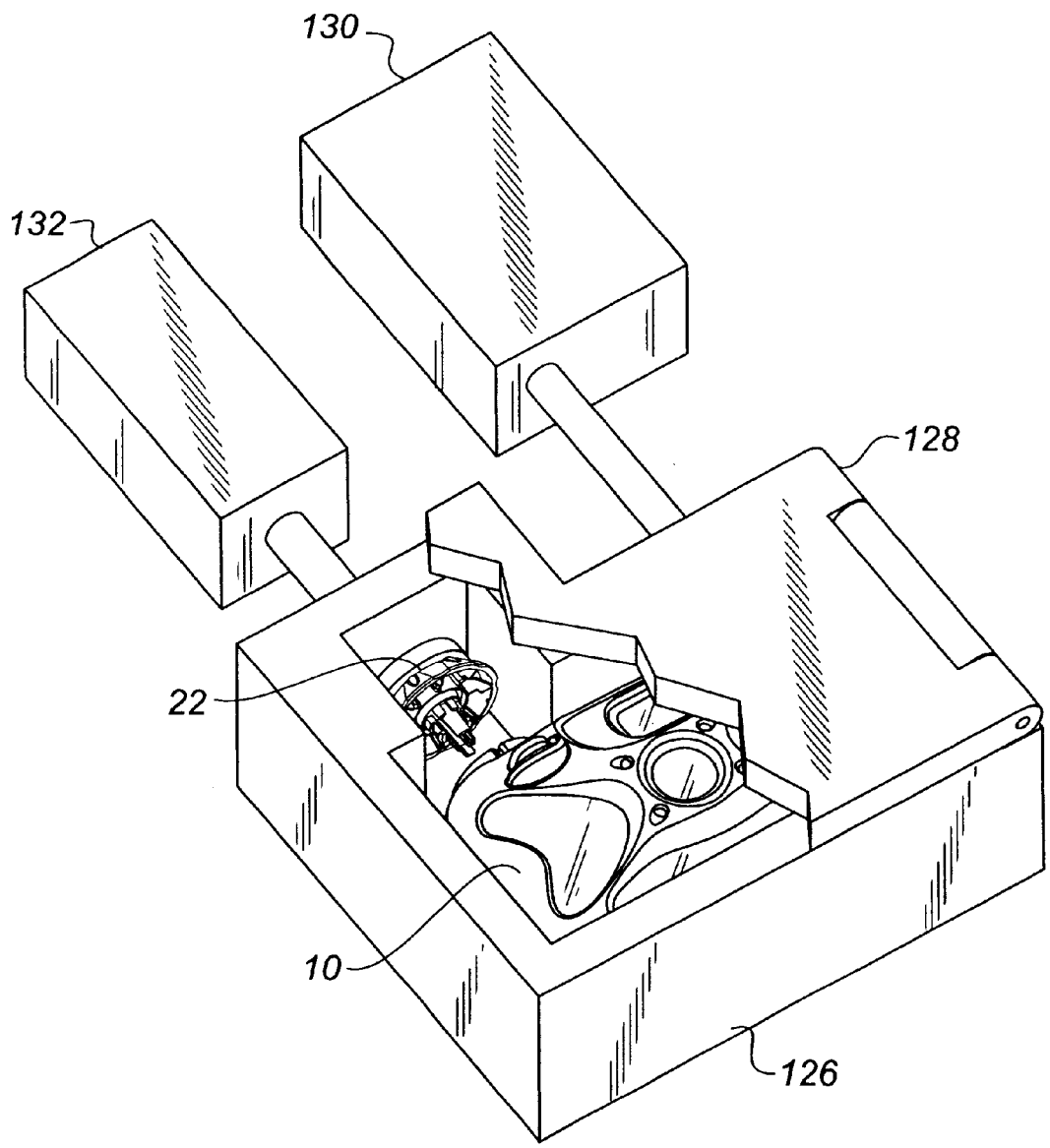
FIG. 49 is the same view as FIG. 48, but the hatch is shown closed, and partial cut-away. The winding knob is not yet seated.
Figure 50:
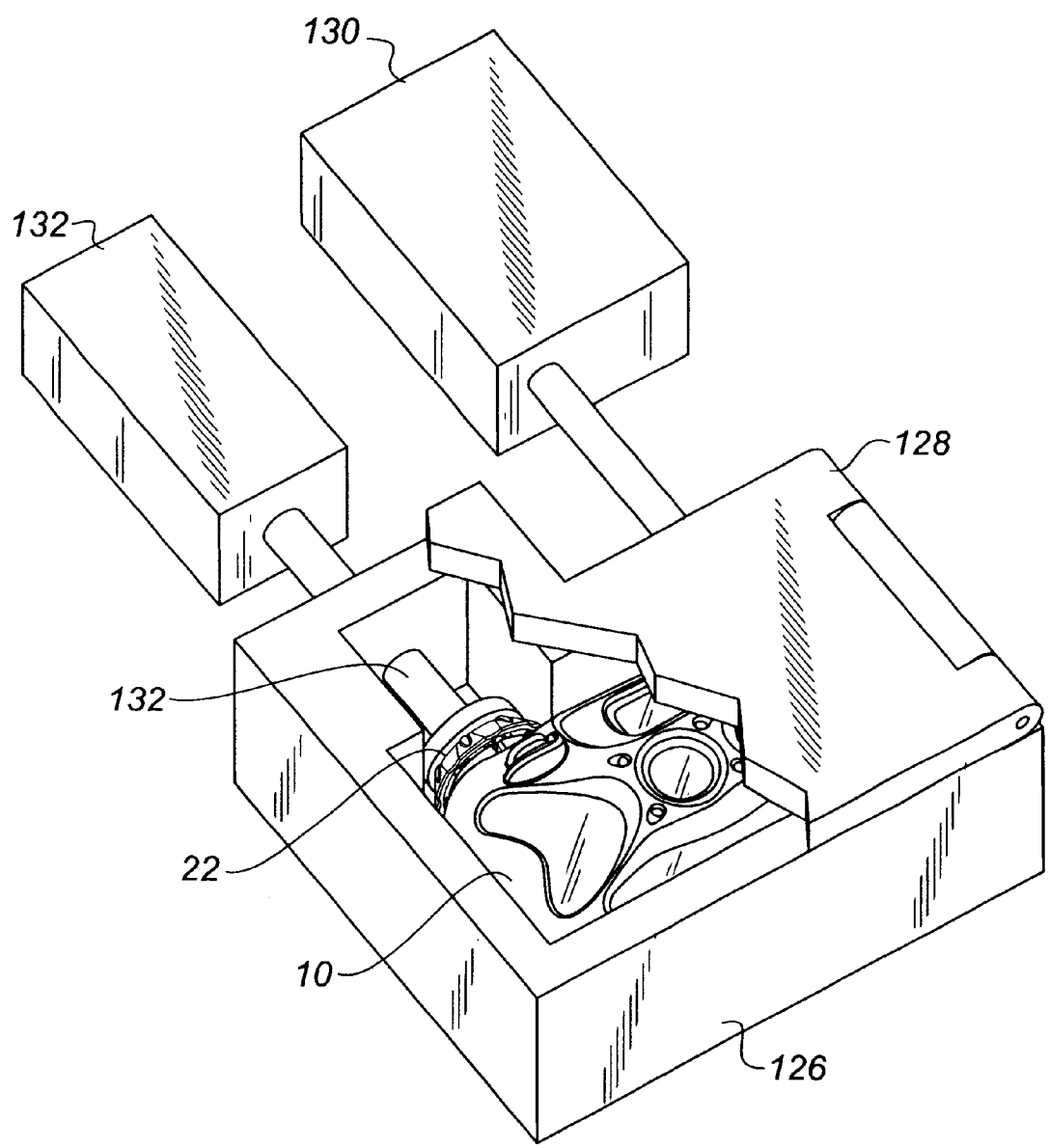
FIG. 50 is the same view as FIG. 49, after seating of the winding knob.

Referring now to FIGS. 48–50, in a preferred embodiment, the partially assembled camera 10 is a placed within a nest 124 in a gas tight enclosure 126, after the housing parts 28,30 are fit together and before the knob 22 is attached. A hatch 128 of the enclosure 126 is closed, sealing the interior of the enclosure 126. The enclosure 126 is then evacuated by a vacuum source 130 to a pressure below atmospheric pressure. If desired, the initial atmosphere can be exchanged with nitrogen or some other atmosphere.

The enclosure 126 has a placement device 132 located in alignment with the passage 36 through the housing 12, when the housing 12 is in the nest 124. The placement device 132 holds the knob 22 and moves linearly so as to install the knob 22 in the passage 36. After the interior of the enclosure 126 has reached a desired pressure and/or atmospheric composition, the knob 22 is pushed into place in the passage 36 of the housing 12. The interior of the enclosure 126 is then repressurized, the hatch 128 is opened, and the completed camera 10 is removed. The camera remains sealed without venting or leakage until usage is completed and the camera is submitted for photofinishing.

It has been determined that sealing, in the camera, air at a reduced pressure is practical for use of the camera 10. The atmosphere sealed within the camera 10, before evacuation, is initially at normal or reduced humidity and at room temperature. In a particular embodiment, the camera 10 is intended to withstand internal temperatures of 120 degrees F. (49 degrees C.). It is preferred for this embodiment that the camera 10 be sealed with an internal pressure of 8.6 psi (59 Kpa). This yields a final pressure of 14.7 psi (101 Kpa) when heated to 120 degrees F. (49 degrees C.).

Figure 4:
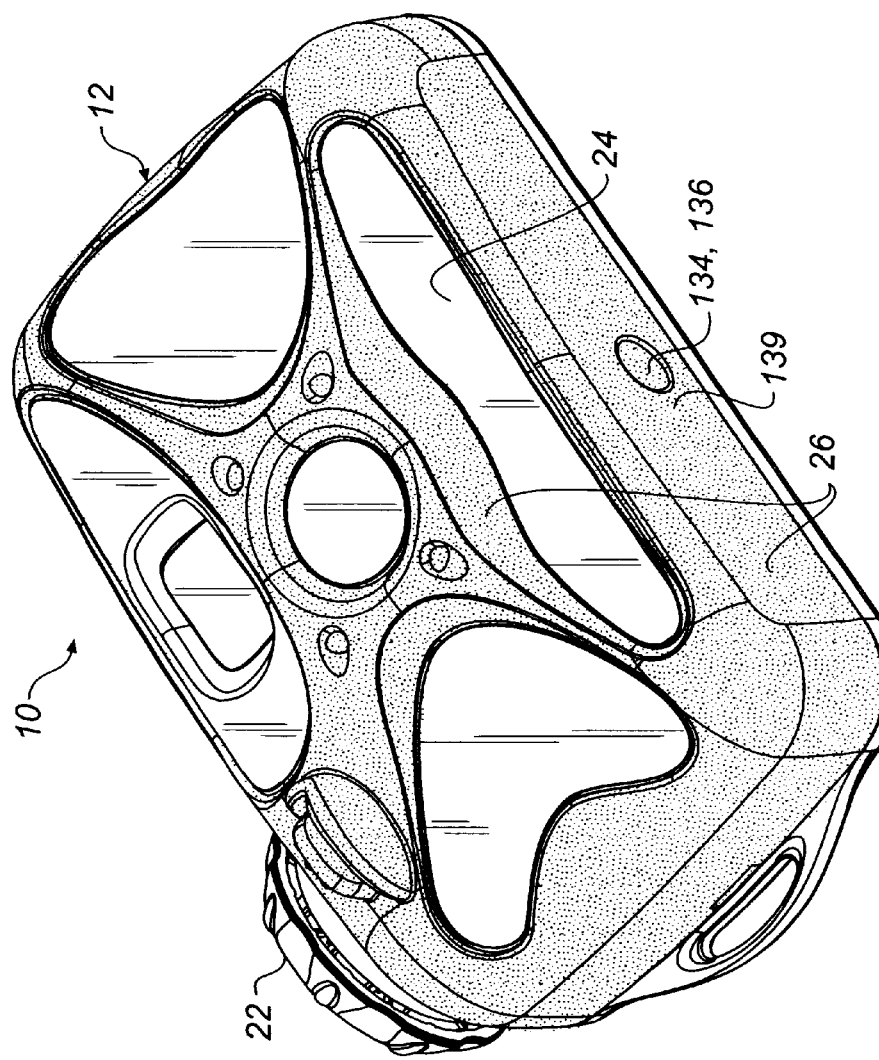
FIG. 4 is a front, bottom perspective view of the camera of FIG. 1.
Figure 5:
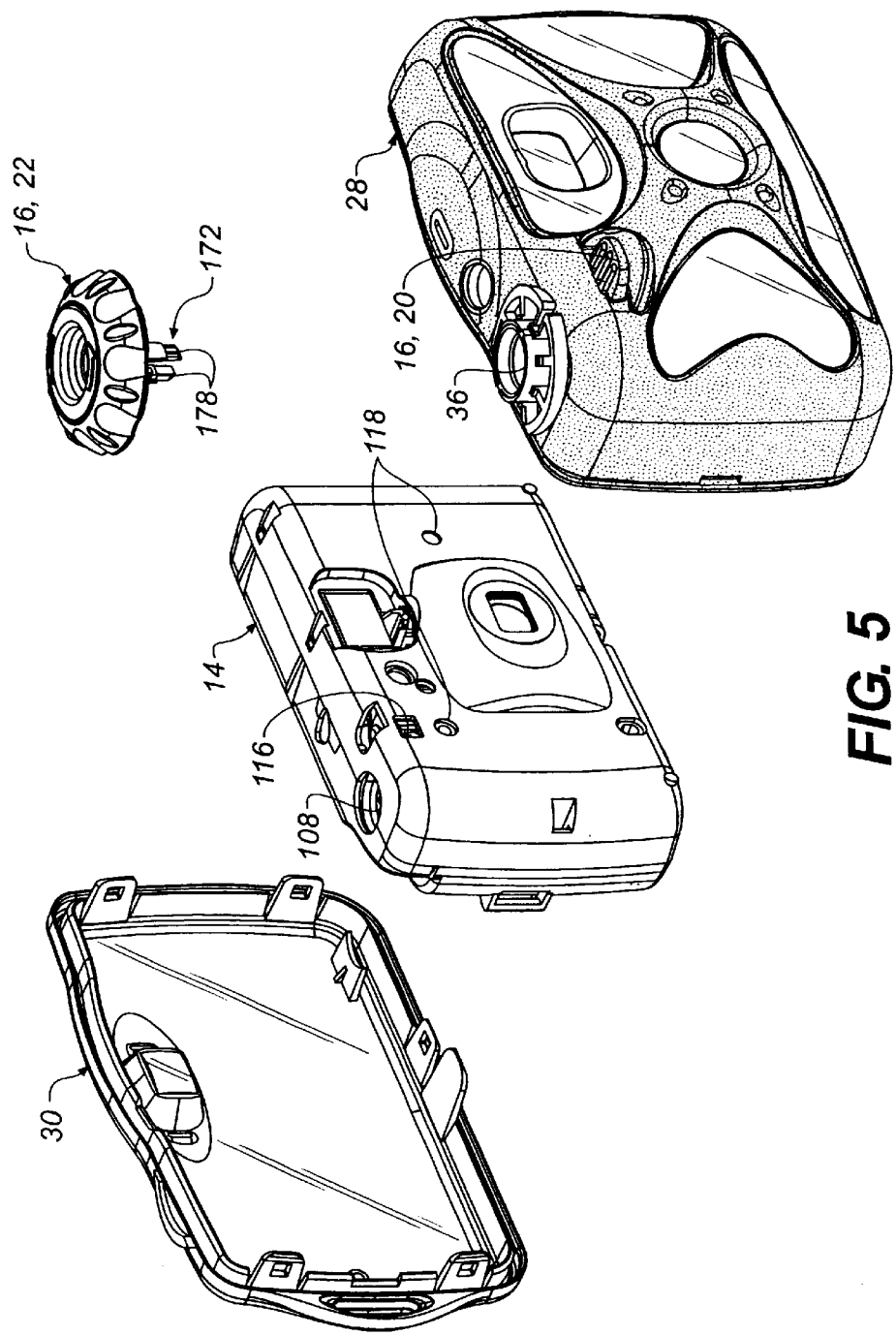
FIG. 5 is a front, partially exploded view of the camera of FIG. 1 showing the front housing part, rear housing part and winding knob separated from the camera frame assembly.
Figure 6:
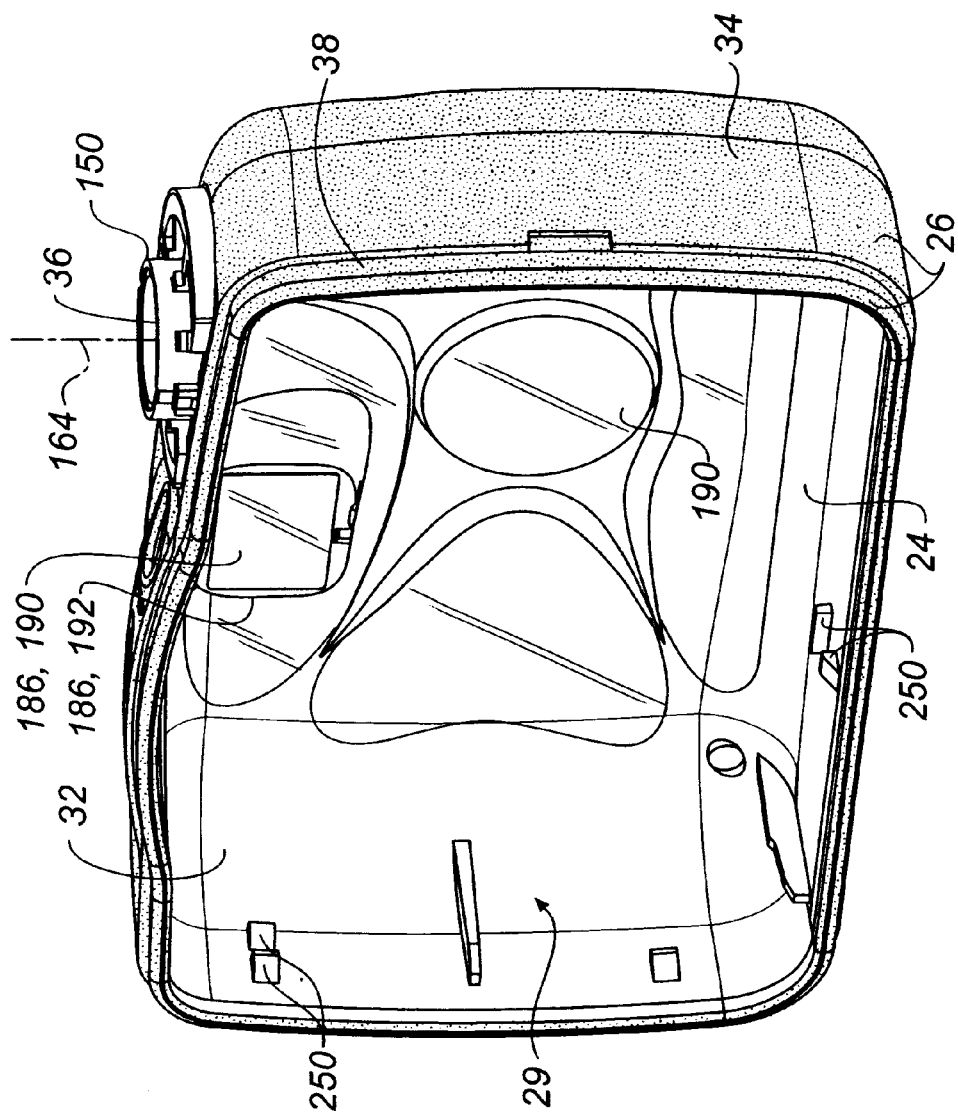
FIG. 6 is a right, rear perspective view of the front housing part of the camera of FIG. 1.
Figure 7:
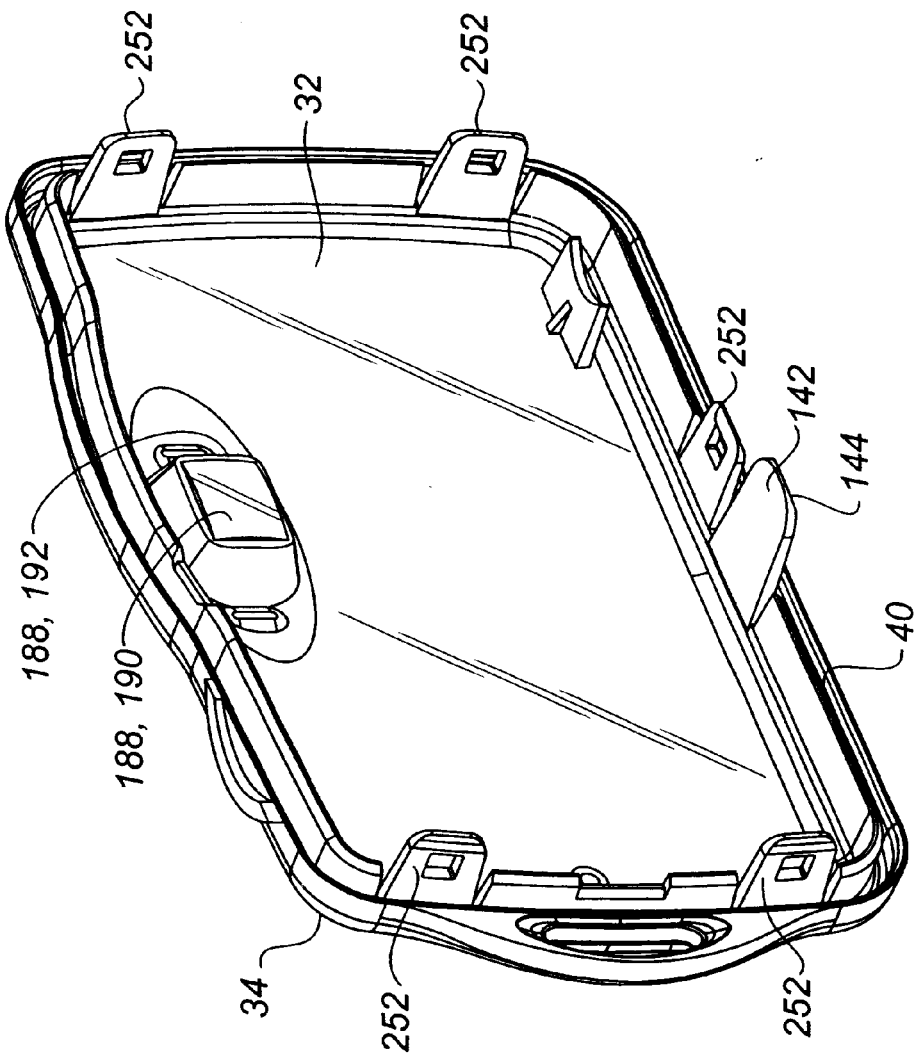
FIG. 7 is a right, front perspective view of the rear housing part of the camera of FIG. 1.
Figure 8:
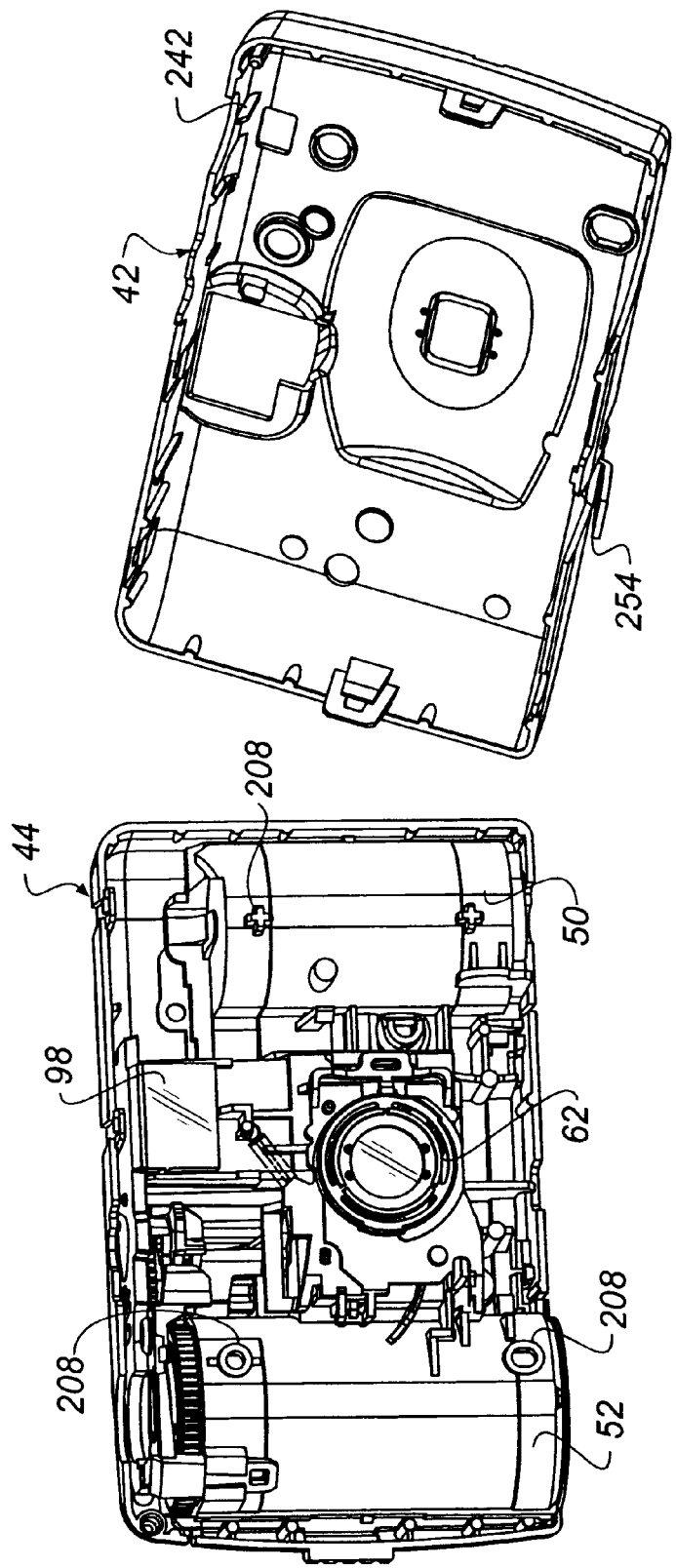
FIG. 8 is a perspective view of the camera frame assembly of the camera of FIG. 1, with the front cover separated from the remainder of the camera frame assembly. The inside of the front cover is shown.
Figure 9:
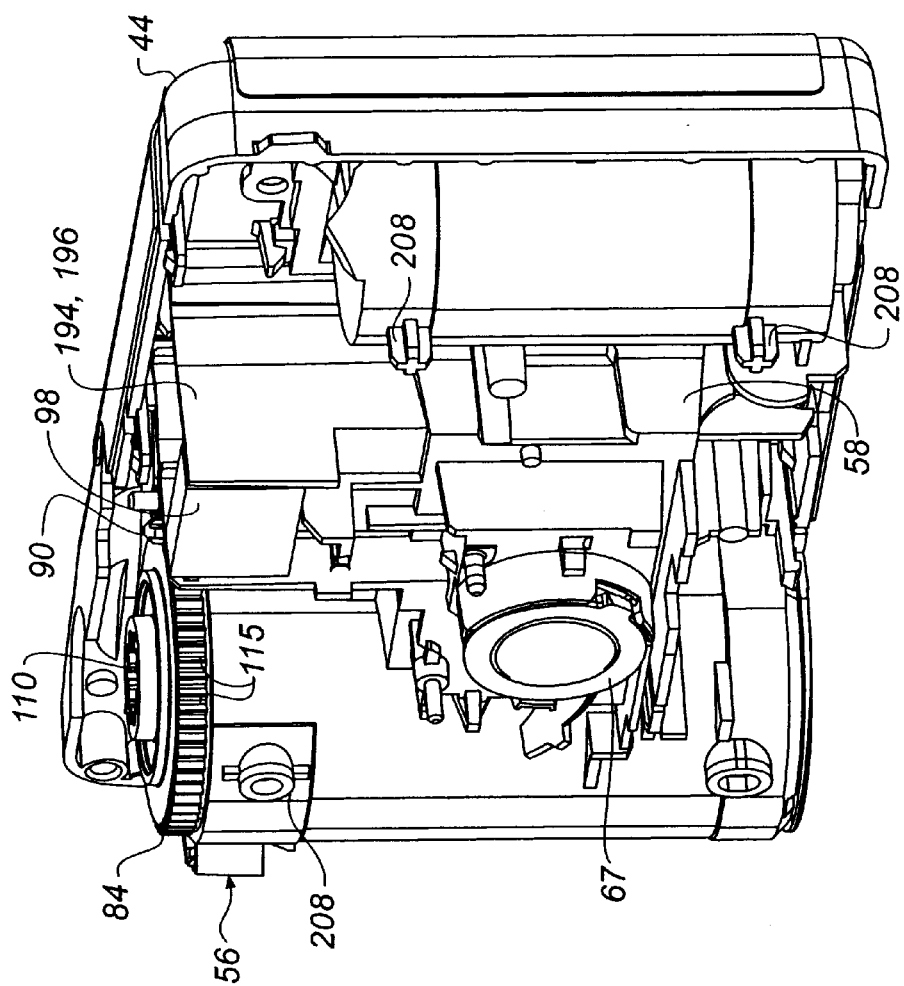
FIG. 9 is a left, front perspective view of the camera frame assembly and attached rear cover of the camera of FIG. 1. The front cover and some other components are deleted for clarity.
Figure 10:
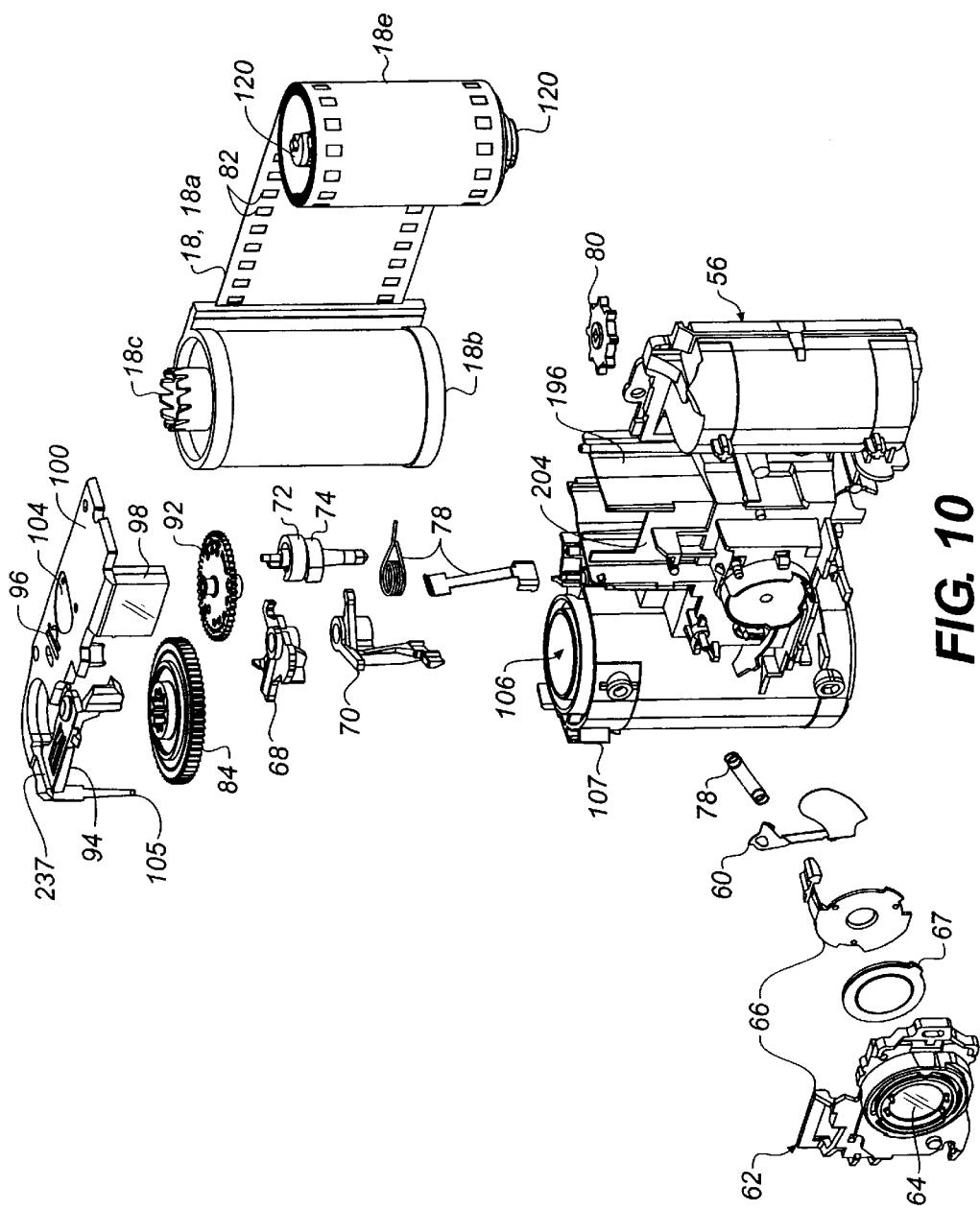
FIG. 10 is an exploded view of the camera frame assembly and film unit of the camera of FIG. 1.

It is a desirable that the camera 10 have a pressurization/seal integrity indicator that provides a constant indication to the user, that the camera 10 remains sealed and, thus, available for underwater use. Such indicators are known in the art. Referring now particularly to FIGS. 4 and 23–25, in a preferred embodiment, the seal integrity indicator 134 is provided by a free region 136 of the elastomer facing 26 that covers 42,44 an opening or passage 138 in one of the housing parts 28,30. Surrounding the free region 136 is a supported region 139 that is united with a border portion or indicator support 140 of the shell 24 surrounding the opening 138. The free region 136 has an outer surface 135 that is exposed to the external environment and an inner surface 137 that is exposed to the interior of the housing 12. The outer surface 135 can be directly exposed to the outside environment, as shown in FIG. 4. The free region 136 can, alternatively, be partially shielded by an extension (not shown) of the shell that protects against intrusion by foreign objects. The latter is not preferred, since it makes difficult or precludes automated or manual detection of seal integrity by touching the free region 136.

In the embodiments shown, the free region 136 is a section of the elastomer facing united with the outside 141 of the shell 24. The free region 136 can instead be provided on the inside 143 of the shell 24.

It is highly preferred that the camera 10 is depressurized sufficiently to deflect the free region 136 inward when the camera 10 is unsubmerged at moderate temperature, 18 degrees C. to 24 degrees C., and moderate altitude, at sea level or below 930 meters above sea level. Under such conditions, the user can check the integrity of the camera seal, while unsubmerged, by looking at or touching the indicator 134. The seal integrity indicator 134 can also be checked during camera assembly using a detector (not illustrated), such as a mechanical finger or optical sensor, or the like. Cameras having an undeflected or incompletely deflected free region 136 can be culled during assembly or otherwise before underwater use. Under high temperatures up to 120 degrees F., the internal pressure can be higher than external pressure, causing the free region to deflect outwards (shown in FIG. 25 by dashed lines).

The seal integrity indicator 134 has a backup 142 that is located, within the housing 12, interior to and overlapping the opening 138. The free region 136 flexes inwardly if a sufficient pressure differential is provided between the interior of the housing 12 and the external environment. The backup 142 is spaced from the free region 136 so as to allow some inward excursion of the free region 136, but to limit inward excursion of the free region 136 under higher pressures. This protects the free region 136 against excessive excursion during use underwater, which could lead to failure and water leakage.

The backup 142 is sufficiently rigid to resist the compressive forces transferred by the free region 136 without distorting. The backup 142 has a primary surface 144 that faces the free region 136. The primary surface 144 is shaped so as to support all or a large area of the free region 136, when the free region 136 is maximally distended. A convenient shape for the primary surface 144 is flat, since this shape is easy to mold and most of the free region 136 is supported at maximal distension. Maximal distension is the extent of distension at a predetermined test depth that meets or exceeds a recommended maximum depth of use. The camera is functional at test depth. Below test depth photographic functionality degrades and eventually ceases. Below test depth is a crush depth, at which the camera catastrophically fails.

Figure 51:
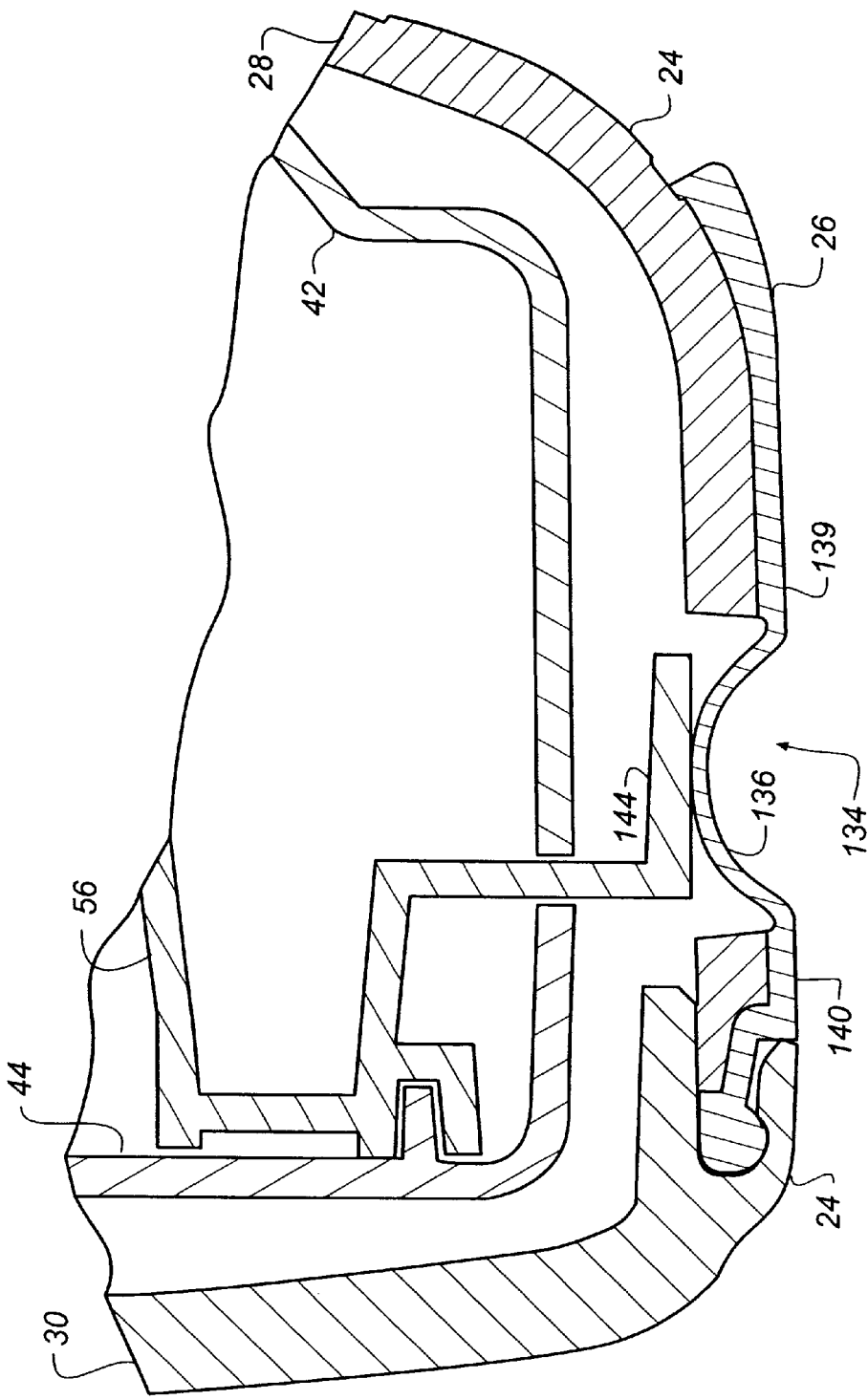
FIG. 51 is the same view as FIG. 25 of another embodiment of the camera. The indicator is deflected inward.

The backup 142 can be part of the shell 24 or part of the camera frame assembly 14. If the backup 142 is part of the camera frame assembly 14, it is preferred that the backup 142 is part of the frame 56 rather than one of the covers 42,44. In the embodiment shown in FIG. 51, the backup 142 is a portion of the frame 56. In the embodiment other figures, the opening 138 is in the front housing part 28 and a backup 142 is a portion of the rear housing part 30.

If the camera 10 is depressurized to an internal pressure of 8.6 psi (59 Kpa), a convenient size for the opening 138 is 9 mm and a convenient depth from the opening 138 in the shell 24 to the backup 142 is 3 mm. A suitable elastomer thickness at the free region 136 is easily selected by trial and error. In preferred embodiments of the invention, the seal indicator 134 does not function as a pressure gauge, since the interior of the camera 10 is evacuated and atmospheric pressure at sea level causes the seal indicator 134 to dish in. In other embodiments, the seal indicator 134 functions as a rough pressure gauge. The opening 138 can be sized and/or stretchiness of the free region 136 can be adjusted to deflect only at a desired water pressure. The interior of the camera 10 can be left at atmospheric pressure, evacuated, or pressurized to further vary the result. Multiple seal indicators 134, each of which dish in at a different depth, can be provided on a camera 10 or other housing 12. Suitable dimensions and characteristics can be easily determined by trial and error. For example, a range of different size holes can be covered with free regions 136 of uniform material and thickness and depths for dishing in of each indicator 134 can then be determined experimentally.

Referring now particularly to FIGS. 2, 5, 18, and 26–30, the winding knob 22 has a handle 146 at one end that is knurled or otherwise shaped so as to be gripped by the user. Extending downward from the handle 146 is the shaft 148 that mates with the socket 110 formed in the thumbwheel 84.

The passage 36 extends through an outwardly extending knob seat 150 on the top of the first housing part 28. The knob seat 150 includes a region of the shell 24 that defines a outer sidewall 152 of the knob seat 150. The outer sidewall 152 extends around the knob seat 150, with one or more interruptions. At the interruptions, a channel 154 extends upward along the knob seat 150 away from the interior of the housing. The knob seat 150 has an inner sidewall or bushing portion 156 that surrounds the passage 36. The bushing portion 156 is formed by the facing 26. The facing 26 also occupies the channels 154. Most of the outer sidewall 152 is thus hard and the inner sidewall is soft. The front housing part 28 has facing 26 over the shell 24 adjoining the outer sidewall 152. This feature and the facing 26 in the channels are artifacts of molding and can be varied by use of more complex molds.

The lower surface 158 of the handle 146 of the knob 22 is shaped so as to be able to register the outer edge 160 of the knob seat 150 and is preferably undercut so as to define an annular slot 162 matched to the shape of the knob seat outer edge 160. The bushing portion 156 is angled inward toward the common axis 164 of the passage 36 and winding knob 22 and toward the interior of the housing 12. The knob 22 has a seal portion 166 having a complementary shape. The seal portion 166 is part of the shaft 148 that borders and extends downward from the slot 162. The seal portion 166 is, thus, shaped like a truncated cone. Below the seal portion 166 and bushing portion 156, the knob 22 and knob seat 150, respectively, have wall portions 168,170 that engage slideably. The wall portion 168 of the knob seat 150 is cylindrical. The wall portion 170 of the knob 22 is illustrated as being shaped like a discontinuous cylinder, but can be continuous, if desired.

Below the wall portion 168 the knob 22 is divided into an engagement portion 172 that mates with the socket 110 of the thumbwheel 84 and an attachment portion 174 that releaseably joins the knob 22 to a joining portion 176 of the front housing part 28. The attachment portion 174 and joining portion 176 together comprise the earlier discussed catch 122.

The engagement portion 172 is shaped so as to mesh with the socket 110 of the thumbwheel 84 and can be solid or, as shown, in the form of a pair of opposed flanges 178. The flanges 178 act as an overrunning clutch, by deflecting under excessive pressure and then recovering elastically. This prevents excessive winding from damaging the components. With a solid engagement portion 172, the socket 110 of the thumbwheel 84 can be modified to provide a similar flexible member and over-running clutch function.

It is preferred that the attachment portion 174 and joining portion 176 of the catch 122 resiliently interlock and that one or both of the attachment portion 174 and joining portion 176 be able to resiliently deflect to permit easy seating and detachment of the knob 22 without risk of damage to the knob 22 or housing part. In the embodiment shown in the Figures, the attachment portion 174 is a pair of opposed hooks 174a, 174b and the joining portion 176 is a pair of opposed ledges 176a, 176b that are portions of the inner surface 32 of shell 24. The ledges 176a, 176b shown in FIGS. 26–27 protrude toward the interior of the housing 12 relative to the rest of the inner surface 32. The ledges 176a,176b can alternatively be coplanar with or recessed relative to the inner surface 32, depending upon shell 24 thickness and the length of the shaft 148 of the knob 22. The hooks 174a, 174b each extend downward and then hook or recurve outwardly. The hooks 174a, 174b engage the inner surface 32 of the shell 24 when the knob 22 is initially inserted in the housing 12. The bottom rim 180 of the passage 36 is angled inward toward axis 164. The hooks 174a, 174b are flexible and the angled bottom rim 180 bends the hooks 174a, 174b to ease the effort required for seating the knob 22. The attachment portion 174 and joining portion 176 can be varied. For example, the joining portion 176 can be in the form of hooks and the attachment portion 174 in the form of ledges or recesses. Hooks can be replaced by spring-loaded detents or other like structures.

The knob 22 is seated, during assembly, by pressing the knob 22 into the passage 36 until the tangs of the hooks 174a, 174b clear the bottom of the passage 36 and engage the inside of the shell 24. The bushing portion 156 is slightly or moderately compressed by this procedure, resulting in a gas-tight seal. In this initial state, the outer edge 160 of the knob seat 150 does not contact the base wall 182 of the slot 162 in the handle 146 of the knob 22.

Figure 2:
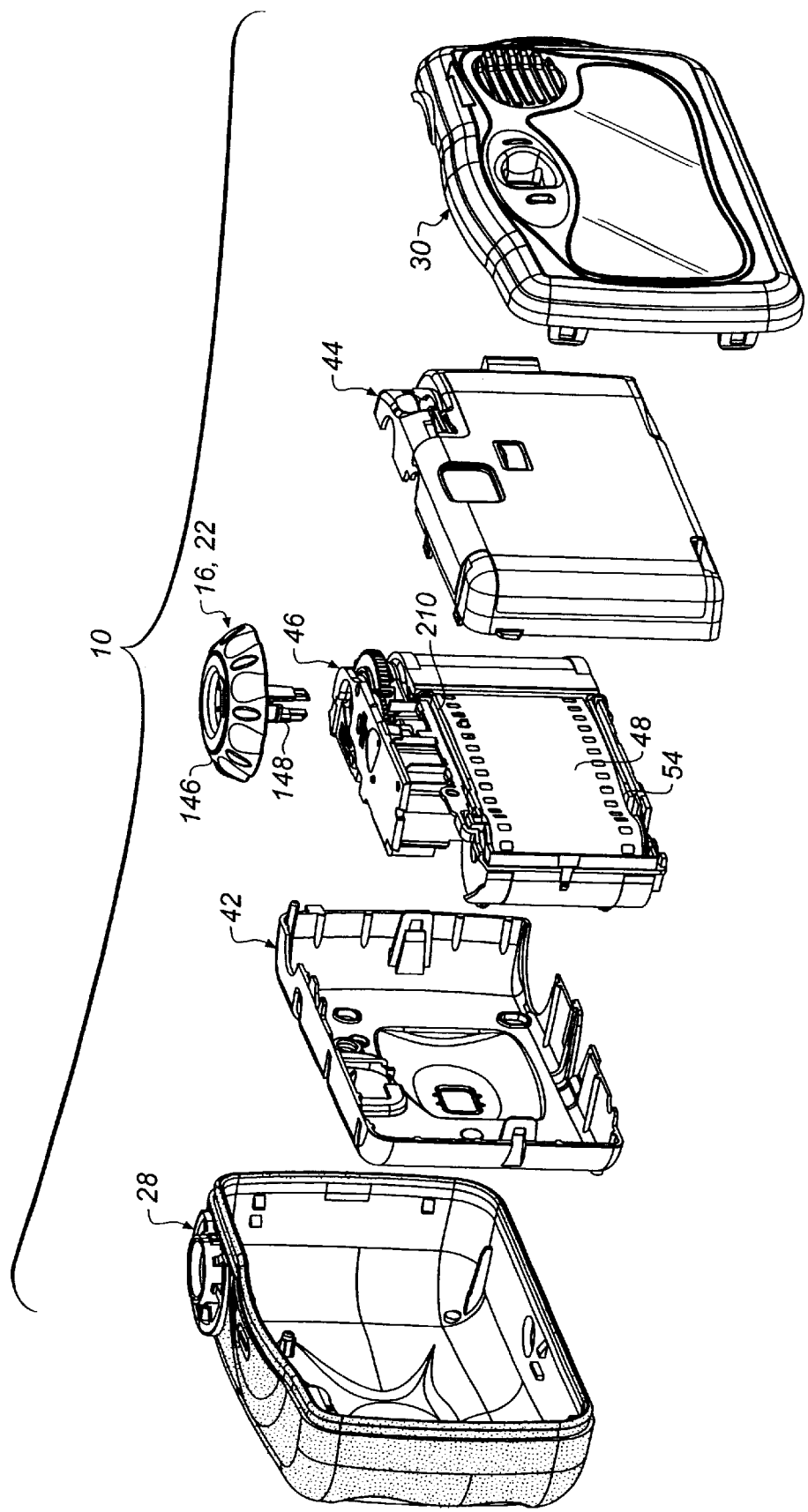
FIG. 2 is a rear, partially exploded view of an embodiment of the underwater one-time-use camera.
Figure 3:
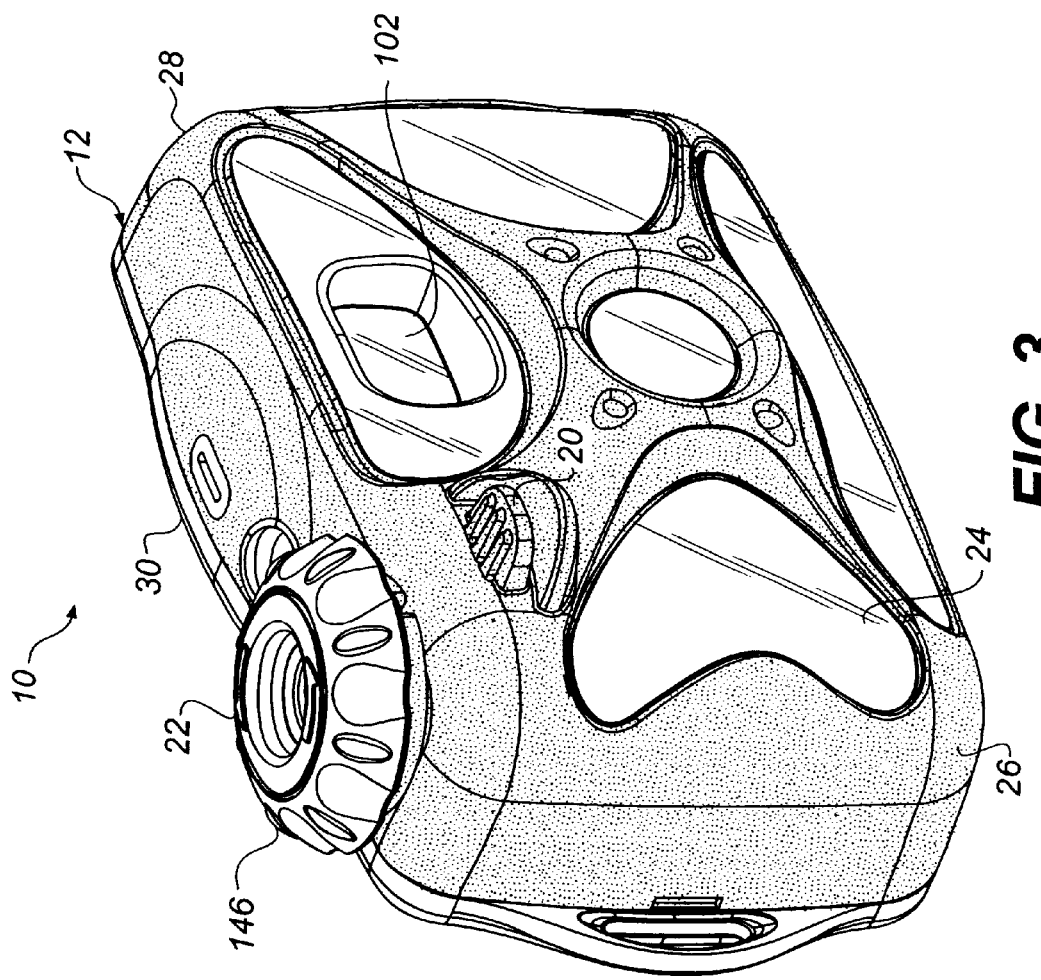
FIG. 3 is a front, top perspective view of the camera of FIG. 1.

Space is provided between the knob 22 and both the socket 110 of the thumbwheel 84 and the outer edge 160 of the knob seat 150, to allow further movement of the knob 22 into the passage 36. This occurs as a result of water pressure during submerged use. Contraction as a result of cooling during submerged use can also contribute to this movement of the knob 22 along the passage 36 toward the interior of the housing 12. When the camera 10 is submerged, the knob 22 is pushed further into the passage 36. This drives the seal portion 166 deeper along the wall of the bushing portion 156, increasing or at least maintaining the area of contact between the two portions in all positions of the knob 22 in the passage 36 from a normal pressure or minimum position through a maximum pressure position. Since the bushing portion 156 is elastomer, the inward movement of the knob 22 is resisted by internal resilience of the bushing portion. For the same reason, the bushing portion 156 tightly grips the seal portion 166. As pressure increases, the knob 22 continues into the passage 36 until reaching a fully traveled state in the maximum pressure position. In the minimum position, the hooks 174 hold the knob 22 in position against the resilience of the bushing portion 156. This resilience must be overcome in initially seating the knob. In the maximum pressure position, the bushing portion is compressed by water pressure until the outer edge 160 of the knob seat 150 bears against the base wall 182 of the slot 162 of the handle 146. The hooks are located interior to the inner surface 32 of the housing 12. The housing 12 can have a partially or fully encircling reinforcement wheel 159 that is a section of the shell 24 and helps bear the load of the knob handle 146 when the knob 146 is in the maximum pressure position. The reinforcement wheel 159 can be split between the two housing parts 28,30, as shown in FIGS. 1–2.

The shell 24 has a support surface 184 that adjoins the bushing portion 156. The support surface 184 is L-shaped and faces outward and toward the axis 164 of the passage 36. The inward travel of the knob 22 in the passage 36 tends to drive the bushing portion 156 back against the support surface 184, compressing the bushing portion 156.

It is preferred that the bushing portion 156 and seal portion 166 have complementary shaped contact surfaces 155,157 and that these surfaces are angled outward relative to the axis of the passage and the interior of the housing. This ensures a good grip between the bushing portion 156 and seal portion 166 in the different positions of the knob 22 in the passage 36.

The knob seat 150 can be modified to accommodate other rotary user controls 16. Such user controls 16 have seal portions 166 and bushing portions 156 like those above-described. The knob seat 150 can be modified for linearly movable controls if a separate feature, such as a flexible bag, is added to provide water-tightness and/or air-tightness. With such a linearly movable control, FIGS. 26–27 would represent a transverse cross-section. Due to the added complexity, a linearly movable control is not preferred.

Referring now to FIGS. 6–10, 15, and 31–32, the camera 10 has a viewfinder 102 that includes portions of the housing 12 and of the frame unit 46. The housing 12 has a pair of opposed viewports 186,188. Each viewport 186,188 has a view area 190 and a structural rim 192 surrounding the view area 190. The structural rims 192 of the two viewports 186,188 bear on opposite ends of a viewfinder tunnel 194 that is a part of the frame 56.

The tunnel 194 is formed by a set of parallel sidewalls 196 that are part of the frame 56. The sidewalls 196 have longest dimensions extending from front to back of the camera 10. The sidewalls 196 can have a set of inwardly directed flanges 198 positioned to block light flare. The sidewalls 196 have front and rear outward edges 200,202 that are closest to respective viewports 186,188. The front and rear covers 42,44 each have a viewport opening 191,193, by means of which the respective viewports 186,188 and outward edges 200,202 come into contact. The sidewalls 196 can extend out one or both openings 191,193. Likewise, one or both viewports 186,188 can extend into a respective opening 191,193.

Front and rear stub walls 204,206 (best seen in FIGS. 10 and 32, respectively) join the sidewalls 196 together at the bottom. Between the stub walls 204,206, the bottom of the viewfinder 102 is provided by a portion of the baffle 58. At the top, the tunnel 194 is open. The keeperplate 88 has a portion that acts as a tunnel top 208 and another portion that provides the viewfinder lens element 98. The tunnel upper wall 100 is offset inwardly from the outward edges 200,202.

When the camera 10 is unsubmerged, the outward edges 200,202 are located in close proximity to the structural rims 192 of the respective viewports 186,188. When the camera 10 is submerged, the housing parts are squeezed toward each other and the compressive load on the viewports 186,188 is transferred directly to the viewfinder tunnel 194, through load-bearing contact of the structural rims 192 and respective outward edges 200,202. In other regions of the camera 10, the compressive force is transmitted from the housing 12 through the respective covers 42,44 to specific sections of the frame 56. Compressive force is primarily transmitted through the front cover 42 to reinforcements 208 located on both of the film chambers 50,52 of the frame 56. These sections of the frame 56 are strong and quite rigid as a result of the shapes required for the film chambers 50,52. Compressive force transmitted through the rear cover 44 is primarily born by the light lock 210,212 of the frame 56 and rear cover 44. The light lock 210,212 is formed at the margins of the film chambers 50,52 and the exposure chamber 54. The light lock 210,212 provides a relatively large area of contact.

The front and rear covers 44 of the camera frame assembly 14 do not receive the compressive load transmitted by the viewports 186,188 when the camera 10 is submerged. In the preferred embodiment shown in the figures, the front and rear covers 44 are offset from the respective viewports 186,188 and do not make contact with the housing 12 in the vicinity of the viewports 186,188. This protects the covers 42,44 from bending stresses, when submerged, which could distort overall shape of one or both covers 42,44 and possibly interfere with camera function. It also allows the covers 42,44 to be unreinforced in the area of the viewfinder 102, since the load is not borne by the covers 42,44 in that area.

Stronger structure must be provided at the viewfinder tunnel 194. This is not an undesirable feature, since the frame 56 is commonly reused when a one-time-use camera 10 is recycled and good structural strength of the frame 56 helps prevent damage during that recycling. The compressive force on reinforcements 208 and light lock 210,212 is unlikely to distort the covers 42,44, since the force is balanced by a bearing structure at each corner of the camera 10 and those structures are relatively near edges of the covers 42,44 and not near large openings. At the viewfinder 102, compressive force that would be more likely to distort the covers 42,44 is born, instead by the tunnel 194 of the frame 56.

One or both of the viewports 186,188 can have an optical power. The other viewports 186,188 or both viewports 186,188 can, alternatively, lack optical power. If the viewport does not have an optical power, then the viewfinder 102 includes the a separate lens element 98 located in close proximity to the respective viewport 186 or 188. A separate lens element can also be used with a viewport 186,188 that has an optical power.

Referring now particularly to FIGS. 3, 15, 21–22, and 33–43, in a particular embodiment, the actuator 20 is attached to the front housing part 28. In the embodiments shown, the actuator 20 is positioned to act on a shutter release. For this reason the actuator 20 is generally referred to herein as a "shutter actuator 20". It will be understood that the actuator can act on any of a wide variety of effectors within the housing, such as pressure or mechanical switches for a variety of camera functions.

The shutter actuator 20 has an outer member 214, an inner member 216, and a torsion bar 218 between the members 214,216. The outer member 214 extends outward from the torsion bar 218, beyond the front surface 220 of the front housing part 28. The inner member 216 extends inward beyond the back surface 222 of the front housing part 28 and through opening 116 in the front cover 42 of the camera frame assembly 14.

The torsion bar 218 bridges an opening in the front housing part 28, dividing the opening into upper and lower subopenings 224,226. In the embodiments shown, the torsion bar 218 is aligned with the front surface 220 of the front housing part 28. The outer and the inner members 214,216 of the shutter actuator 20 extend outward and inward respectively from the torsion bar 218.

External portions of the shutter actuator 20 are fully covered by the facing 26. In other words, the facing 26 overlies the outer member 214 and outside surface of the torsion bar 218. For this purpose, it is preferred that the facing 26 is made of elastomer codiffused with the shell 24. The facing 26 bridges over the upper and lower subopenings 224,226 of the front housing part 28. The housing 12 is, thus, sealed at the shutter actuator 20. The portion of the facing 26 overlying the outer member 214 of the shutter actuator 20 can have ridges or other relief to reduce the risk of slippage of the user's finger from the shutter actuator 20 while underwater or in other rough usage.

It is highly preferred that the shutter actuator 20 is formed in a one-piece with the facing 26 and shell 24 of the front housing part 28. In that case, the shutter actuator 20 is engineering plastic formed in the first shot of the two-shot molding along with the shell 24. It is also highly preferred that the facing 26 is formed over the shell 24 and shutter actuator 20 during the second shot of the two-shot molding process.

The shutter actuator 20 is movable relative to the front housing part 28 between an initial orientation and a pivoted orientation. The torsion bar 218 is twisted about a longitudinal axis (this axis is not indicated in the figures) transverse to the subopenings 224,226 in the front housing part 28, when the shutter actuator 20 is moved from the initial orientation to the pivoted orientation. The internal resilience of the torsion bar 218 biases the shutter actuator 20 toward the initial orientation. (The torsion bar 218 is relaxed in the initial orientation and tensioned in the pivoted orientation.) The elastomer of the facing 26 covers and, optionally, extends into the upper and lower subopenings 224,226 forming a pair of resilient corner pads 228,230. When the shutter actuator 20 is deflected from the initial orientation to the pivoted orientation, the corner pads 228,230 are distorted and, by internal resilience, provide an additional biasing of the shutter actuator 20 toward the initial orientation.

It is preferred that equal biasing of the shutter actuator 20 be provided by the upper and lower corner pads 228,230. The biasing provided by the corner pads 228,230 is a function of material, size, and shape. For simplicity, it is preferred that the corner pads 228,230 are each of the same material and are the same size and shape. In that case, the resilience of the two corner pads 228,230 tends to be balanced. If the resilience is not balanced, then the shutter actuator 20 is more resistant to pivoting in one direction than the other. This interferes with ease of use and, depending upon the direction of maximum resistance, can result in unintended exposures.

It is highly preferred that the biasing of the shutter actuator 20 toward the initial orientation is mostly provided by the torsion bar 218 rather than the corner pads 228,230. The change in resilience of the torsion bar 218, with depth, is less than the change in resilience of the corner pads 228,230. The corner pads 228,230 tend to "stiffen", that is become more resistant to deflection, when distended inward by water pressure. The effect of such stiffening on the shutter actuator 20 can be minimized by limiting the biasing of the shutter actuator 20 by the corner pads 228,230 to a small percentage of the total biasing of the shutter actuator 20. The use of corner pads 228,230 that provide a small percentage of the total resilience also reduces the effect of any inadvertent inequalities in the resilience of the upper and lower corner pads 228,230 due to irregularities in the molding process or the like.

The inner member 216 is positioned within the camera frame assembly 14 such that the pivoting movement of the shutter actuator 20 pushes the inner member 216 against the shutter release 94. This causes the shutter release 94 to pivot upward and releases the latching of the high-energy lever 70. The high-energy lever 70 swings under the action of a biasing spring 78. The high-energy lever 70 strikes an end of the shutter 60, which swings open for an exposure of a film frame 56. The shutter 60 then swings closed as a result of the biasing of a shutter biasing spring 78. The film 18d is wound forward to the next frame 56 and the cycle is repeated. An example of a suitable mechanism that provides these functions is described below. Alternative shutter mechanisms can be used, with the limitation that the triggering movement of the inner member 216 of the shutter actuator 20 is in an upward direction.

The outer member 214 of the shutter actuator 20, which extends outward from the front surface 220 of the front housing part 28, has two opposed counterbalance surfaces 232,234. One counterbalance surface 232 faces upward the other counterbalance surface 234 faces downward. A shutter actuation is provided by pressing the upper counterbalance surface 232 of the outer member 214 in a downward direction. Since both counterbalance surfaces 232,234 are exposed to the external environment in both the initial orientation and the pivoted orientation, water pressure on the outer member 214 does not change when the shutter actuator 20 is tripped.

The facing 26 of the camera 10 provides some corner padding against rough treatment. For additional protection, a guard 236 can be provided on the front housing part 28 so as to help protect the outer member 214 of the shutter actuator 20. The guard 236 can be shaped so as to extend beyond the outer member 214 in all directions and protect the outer member 214 from impact. The counterbalance surfaces 232,234 are continuously spaced from the guard 236 to ensure equal water pressure on both counterbalance surfaces 232,234.

Referring now to FIGS. 36–39, when the shutter actuator 20 is pushed down the shutter release 94 is pivoted in an upward direction away from the interior of the camera frame assembly 14. This causes the latched high-energy lever 70 to be released, striking the shutter 60, and exposing a film frame 56. The shutter release 94 is joined to a main portion of the keeperplate 88 by a living hinge 237.

Figure 40:
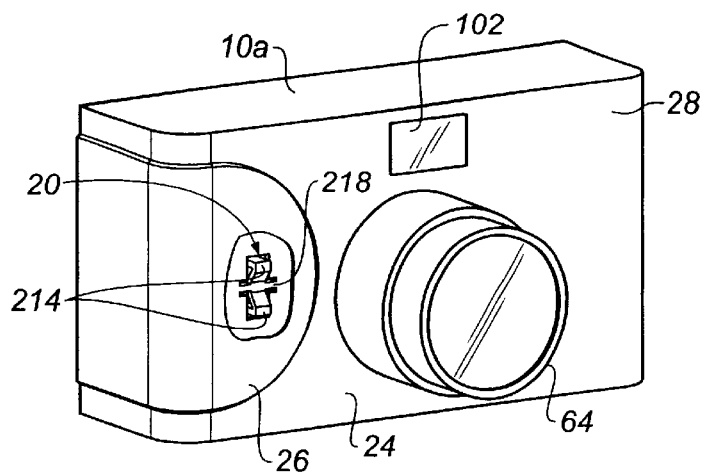
FIG. 40 is a front perspective view of another alternative embodiment of the camera. A portion of the facing is cut-away to better show the shutter actuator.
Figure 41:
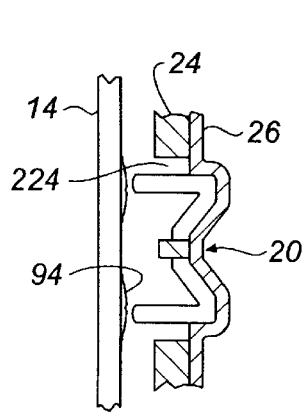
FIG. 41 is a partial cross-sectional view of the camera of FIG. 40 taken substantially all along line 41-41. The shutter actuator is shown.in an initial orientation.
Figure 42:
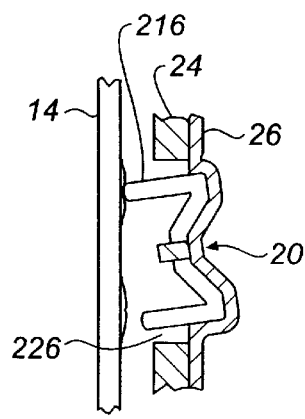
FIGS. 42–43 are the same view as FIG. 41, except the shutter actuator is shown in the two alternative pivoted orientations.
Figure 43:
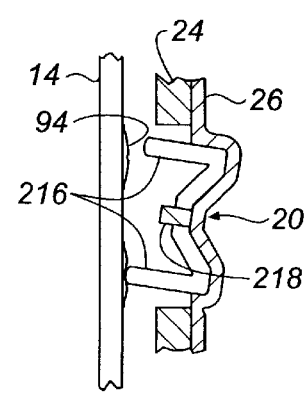
Figure 44:
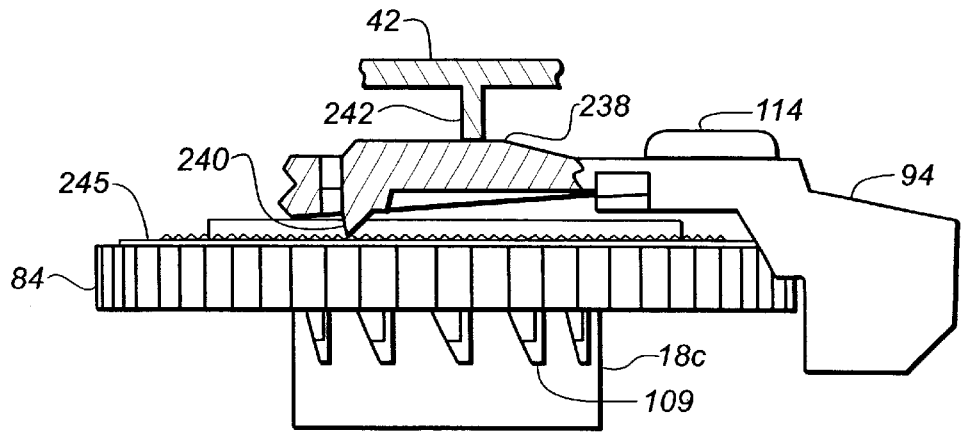
FIG. 44 is a partial enlargement of the view of FIG. 35, of a modification of the camera, in which the sprag is tooth-shaped and the thumbwheel has a rack. The shutter release is in the downward pivoted configuration.
Figure 45:
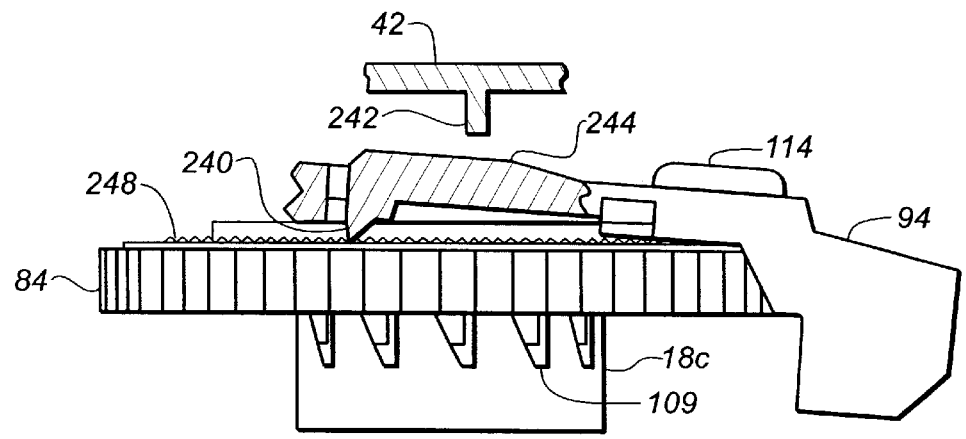
FIG. 45 is the same view as FIG. 44, but the shutter release is shown in the unpivoted configuration.
Figure 46:
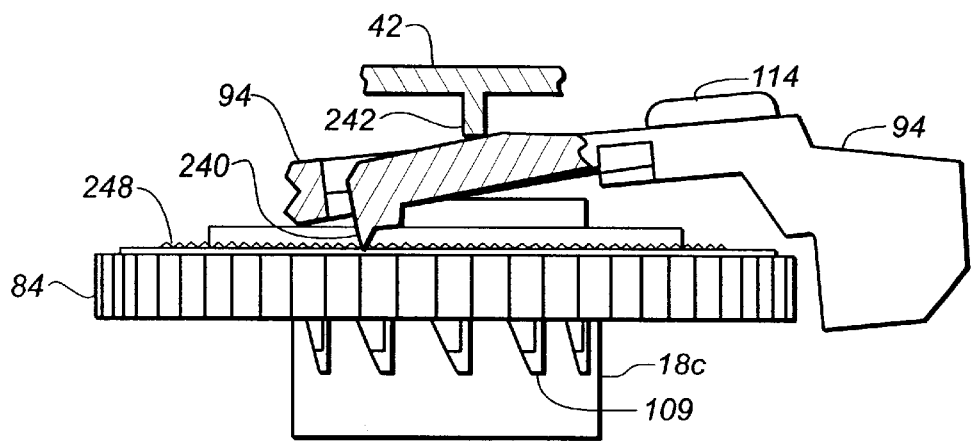
FIG. 46 is the same view as FIG. 44, but the shutter release is in the upward pivoted configuration.
Figure 47:
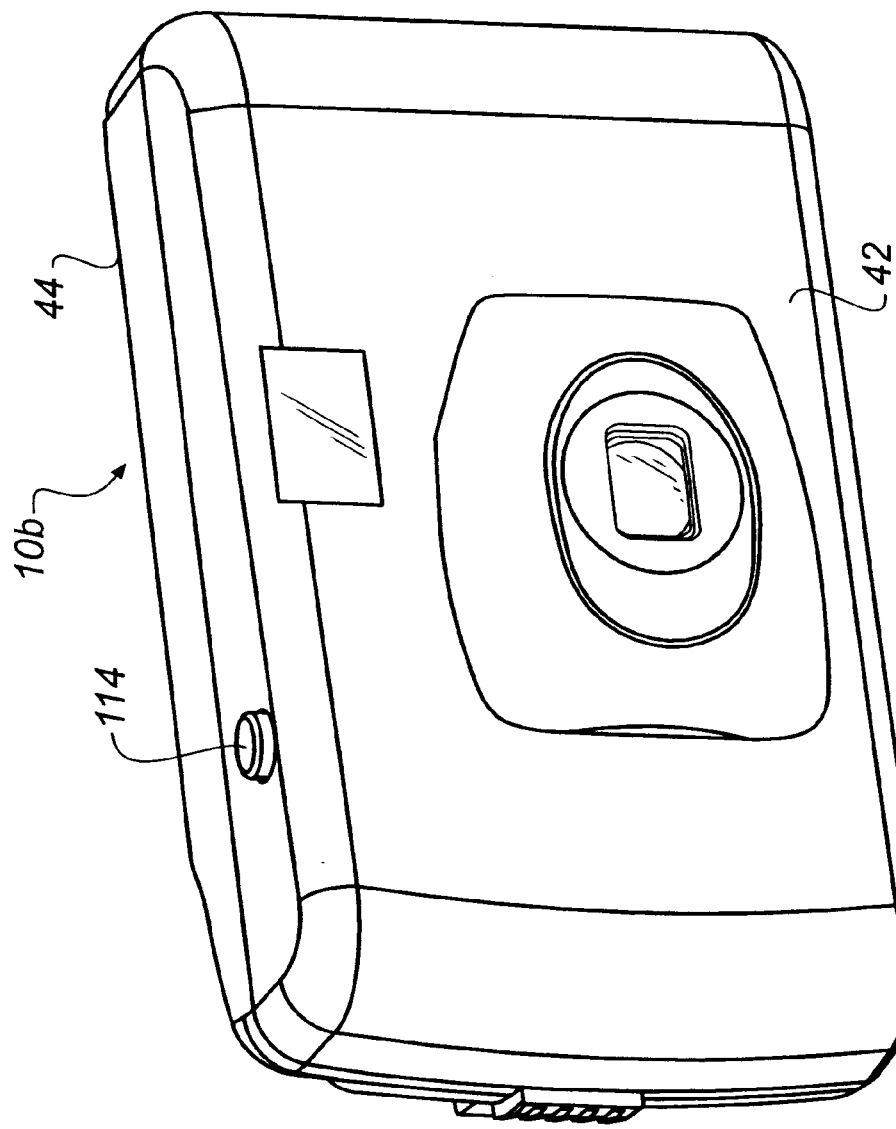
FIG. 47 is a front perspective view of an alternative camera including the frame unit of the camera of FIG. 1. The button of the shutter release is shown.

In a particular embodiment of the invention shown in FIG. 40, a camera 10a has a shutter actuator 20 that pivots in and out relative to a front housing part 28. In this embodiment, the torsion bar 218 is joined to two opposed outer members 214 and two inner members 216 extend inward from respective outer members 214. The facing covers and contacts the outer members 214 and subopenings 224,226. When pressed by the user, the shutter actuator 20 pivots from an initial orientation, shown in FIG. 41, to either of two pivoted orientations, shown in FIGS. 42–43. A shutter release 94 is contacted by the shutter actuator 20 in the pivoted orientations. The shutter release 94 shown in FIGS. 41–43 is a pair of contact pads for an electronic shutter (not illustrated). Other shutter releases can be provided in a similar manner.

Referring now particularly to FIGS. 33–39 and 44–47, in a particular embodiment of the invention, the shutter release 94 is pivotable in both the upward direction just described and in an opposite, downward direction toward the interior of the camera frame assembly 14. In this embodiment, a sprag 238 is joined to the shutter release 94. The sprag 238 bears against the thumbwheel 84 when the shutter release 94 is in either the upward released position or the downward released position.

The shutter release 94 is released in an upward direction when used in a camera having shutter actuator 20. The shutter release 94 can also be released in a downward direction, during manufacturing, prior to installation of covers 42,44, or if used in a non-underwater camera 10b (shown in FIG. 47) having features like the camera shown in FIG. 1, but no housing and an exposed shutter button 114.

The sprag 238 is a cut-out section that is pivotably joined to the shutter release 94 by a living hinge 239. The sprag 238 can pivot independent of the shutter release 94. The sprag 238, as a result of the internal biasing of the living hinge 239, is initially in an unpivoted configuration, in which the sprag 238 is aligned with the shutter release 94. In the unpivoted configuration, the sprag 238 does not bear on the thumbwheel 84. The sprag 238 is in the unpivoted configuration when the shutter release 94 is in a neutral or ready position and the high-energy lever 70 is latched, or, alternatively, the high-energy lever 70 has discharged, but the film frame 56 exposed has not been advanced.

When the shutter release 94 is moved into the downward released position, the sprag 238 pivots with the shutter release 94 until a downwardly extending tab 240 of the sprag contacts an upper surface 245 of the thumbwheel 84. At that time, the sprag 238 bears against the thumbwheel 84 under the biasing of the living hinge 239. When the shutter release 94 assumes the upward released position, a downwardly extending toe 242 contacts the sprag 238 and pushes the sprag 238 into the pivoted configuration as a result of the interference between a ridged surface 244 on the sprag 238 and the toe 242. The toe 242 can be provided as a protrusion of the front cover 42.

The tab 240 of the sprag 238 bears on the thumbwheel 84 and is configured so as to frictionally engage the thumbwheel 84 or to mesh with the thumbwheel 84. In the first case, illustrated in FIG. 35, the tab 240 is rounded off or flattened at an end adjoining the thumbwheel 84 and the thumbwheel 84 has a surface or track 246 that receives the tab 240. The track 246 can be in the form of a groove. The surface of the track 246 can be roughened or otherwise finished or treated to improve frictional engagement. In the second case, illustrated in FIGS. 44–46, the thumbwheel 84 has a toothed rack 248 in place of the track 246. The shape of the tab 240 is complementary to the teeth of the rack 248.

Referring now particularly to FIGS. 6–7, 11–20, and 22–23, in a particular embodiment of the invention, the rear housing part 30 is attached to the front housing part 28 by means of lugs 250 that engage matching catch portions 252 of the other part. The catch portions of the housing part or parts are internal lugs and internal eye-tabs (flanges with a hole for a respective lug). Preferred engineering plastics used for the shell 24 of the housing parts have sufficient flex to permit deflection of the catch portions 252 past the lugs 250 during assembly.

Figure 13:
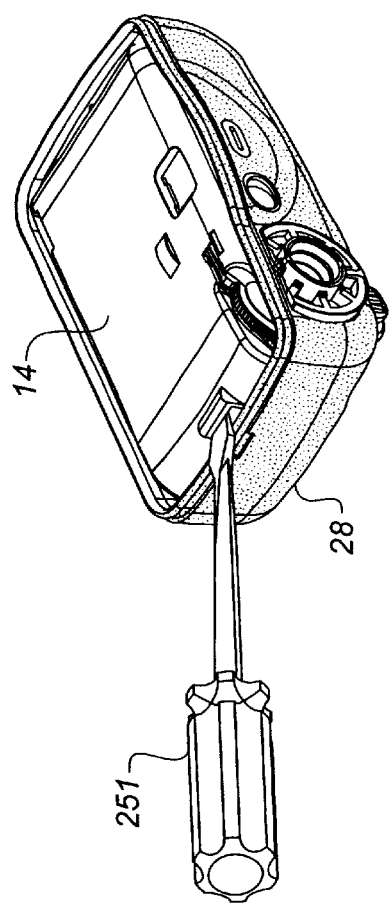
FIG. 13 is a perspective view of the front housing part and camera frame assembly of FIG. 12. A screwdriver is shown inserted in the screwdriver slot for pivotal movement against the front housing part to open the film door for film unit removal.
Figure 14:
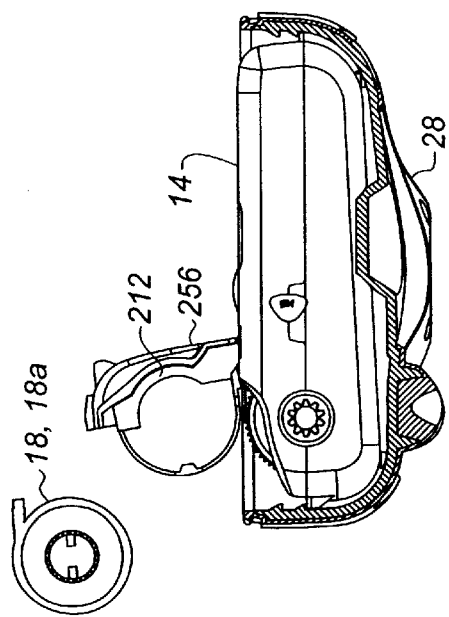
FIG. 14 is a top view showing the camera frame assembly and front housing part of FIG. 13 with the film door opened and the film unit removed. The front housing part is shown in cross-sectional view and the camera frame assembly is shown in top plan view.
Figure 15:
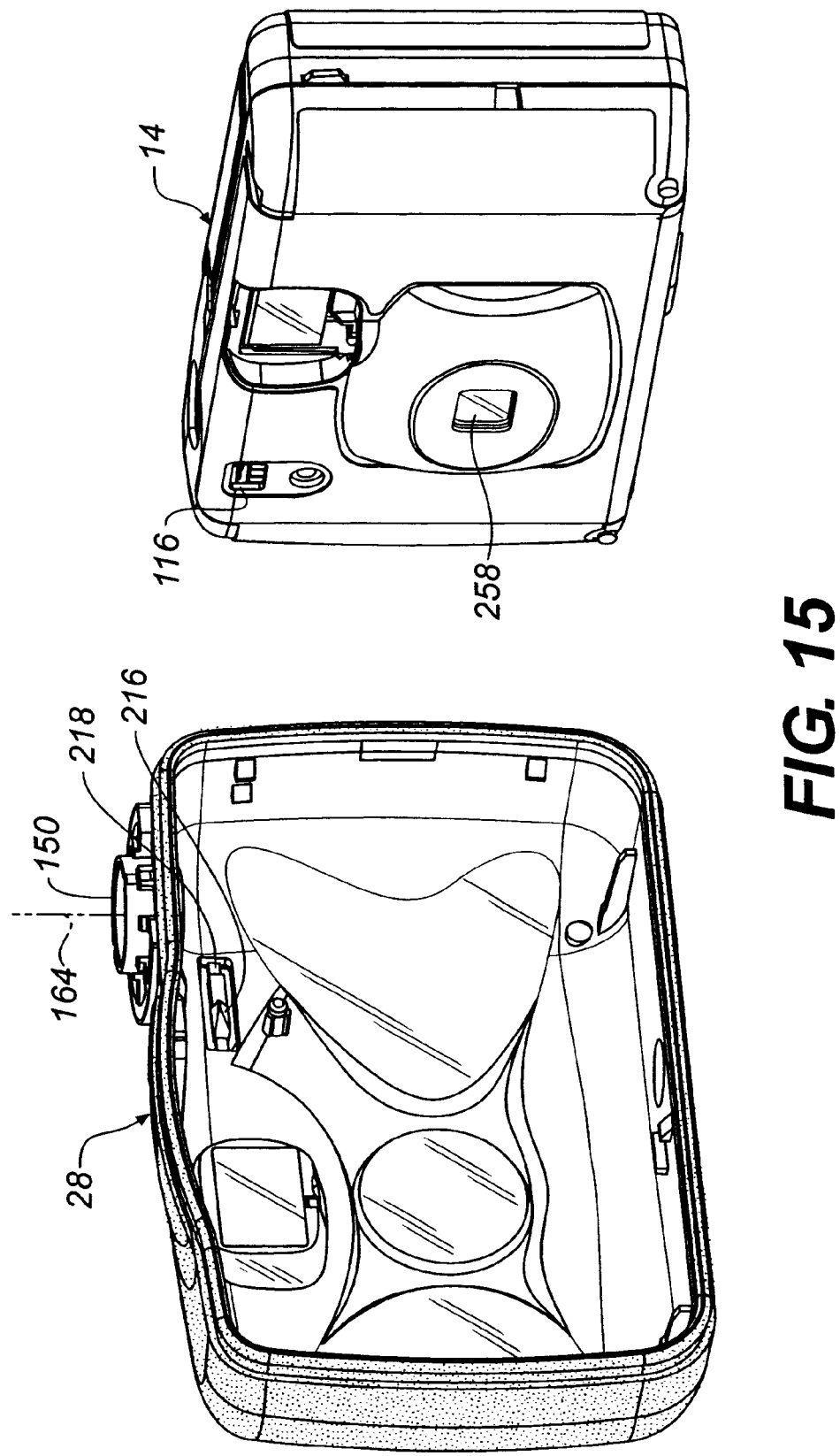
FIG. 15 is a perspective view of the front housing part and camera frame assembly of FIG. 13 following removal of the camera frame assembly from the front housing part.
Figure 16:
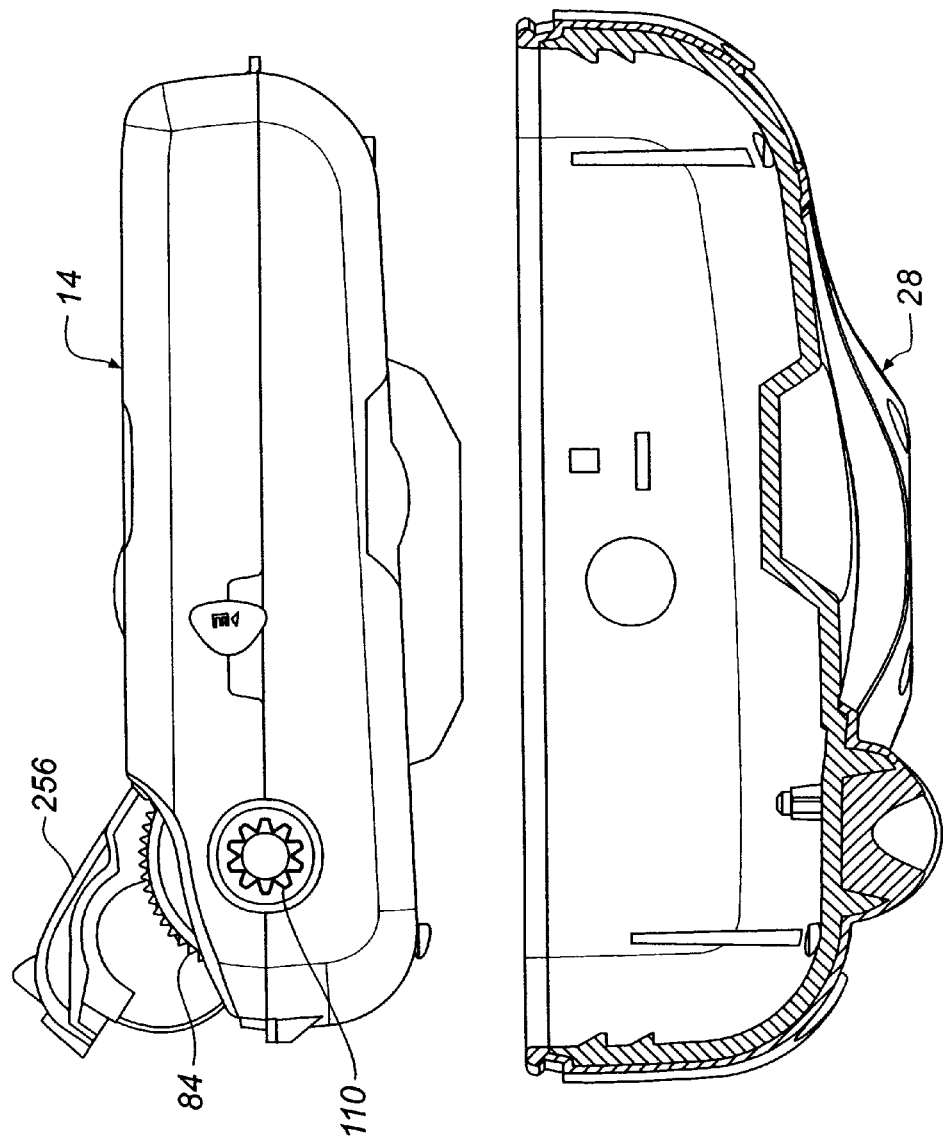
FIG. 16 is the same view as FIG. 14, but with the camera frame assembly detached from the front housing part. The front housing part is shown in cross-sectional view and the camera frame assembly is shown in top plan view. The film door is shown partially closed by the action of the living hinge.
Figure 17:
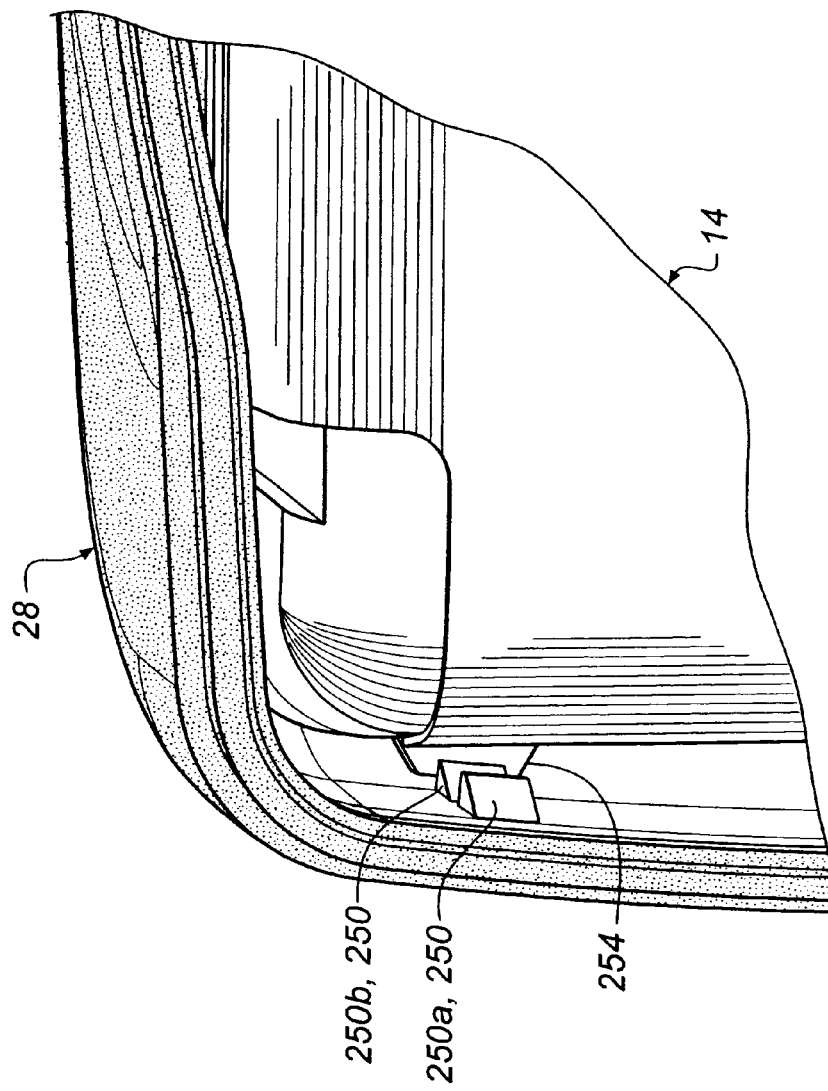
FIG. 17 is a partial rear perspective view of the camera frame assembly and front housing part of FIG. 11. The upper left corner is shown.
Figure 18:
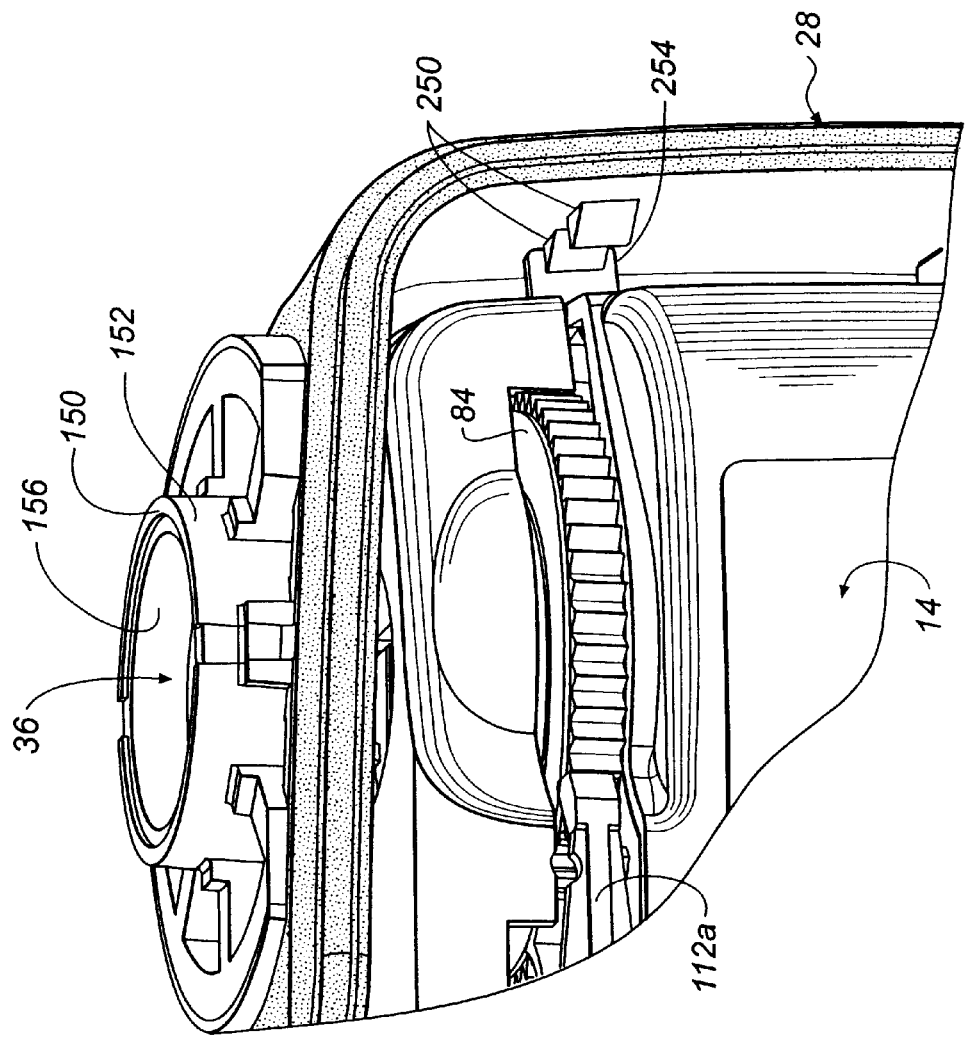
FIG. 18 is a partial rear perspective view of the camera frame assembly and front housing part of FIG. 11. The upper right corner is shown.
Figure 19:
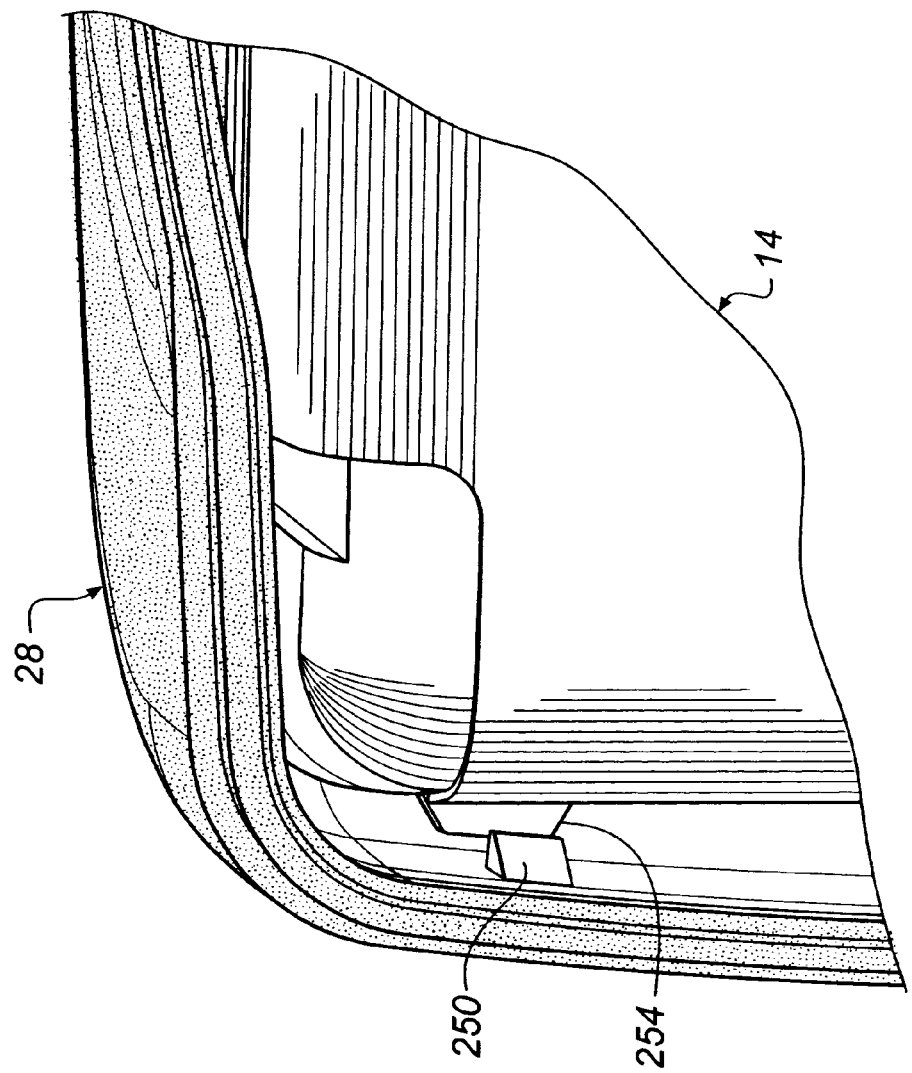
FIG. 19 is the same view as FIG. 17 of an alternative embodiment of the camera.
Figure 20:
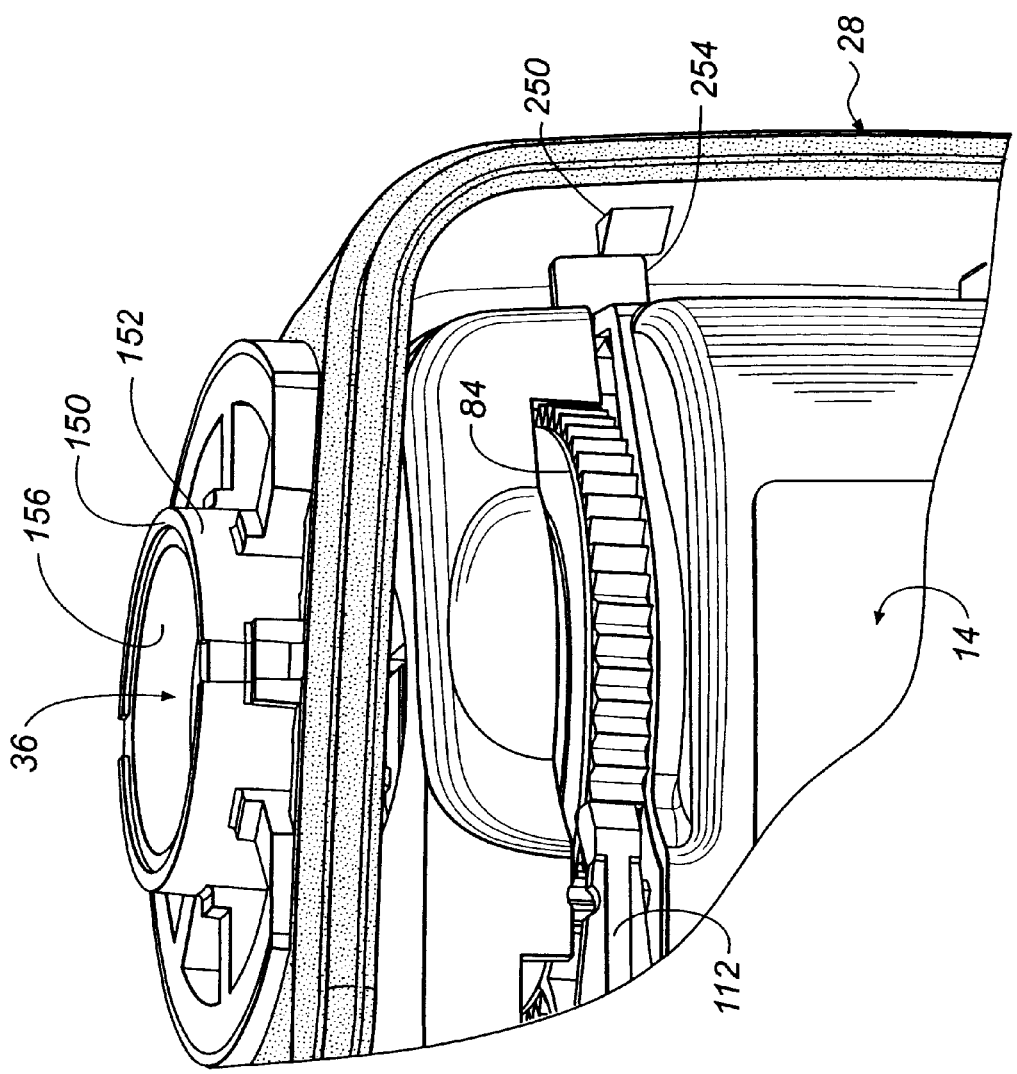
FIG. 20 is the same view as FIG. 18 of the camera of FIG. 19.
Figure 21:
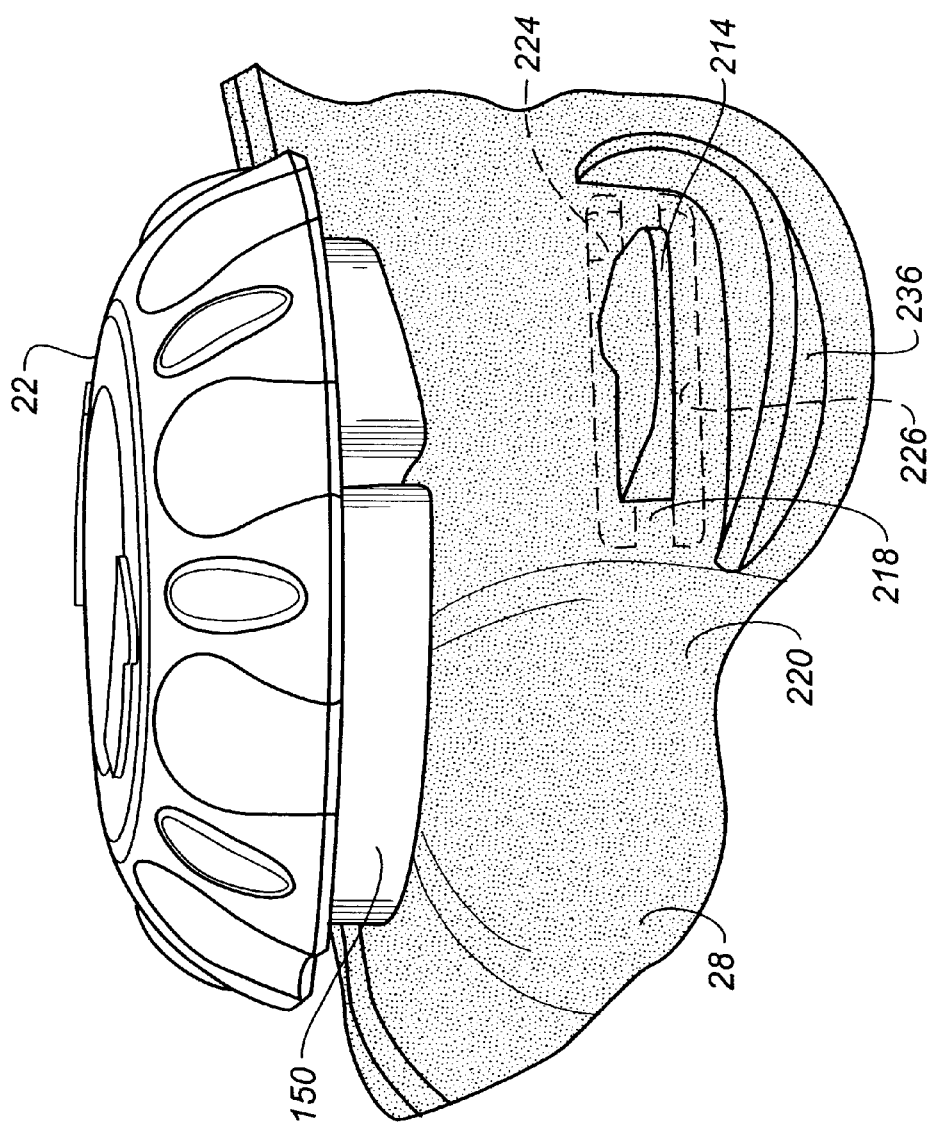
FIG. 21 is a partial enlarged perspective view of the camera of FIG. 1 showing the winding knob and shutter actuator. For clarity, the facing is not shown.
Figure 22:
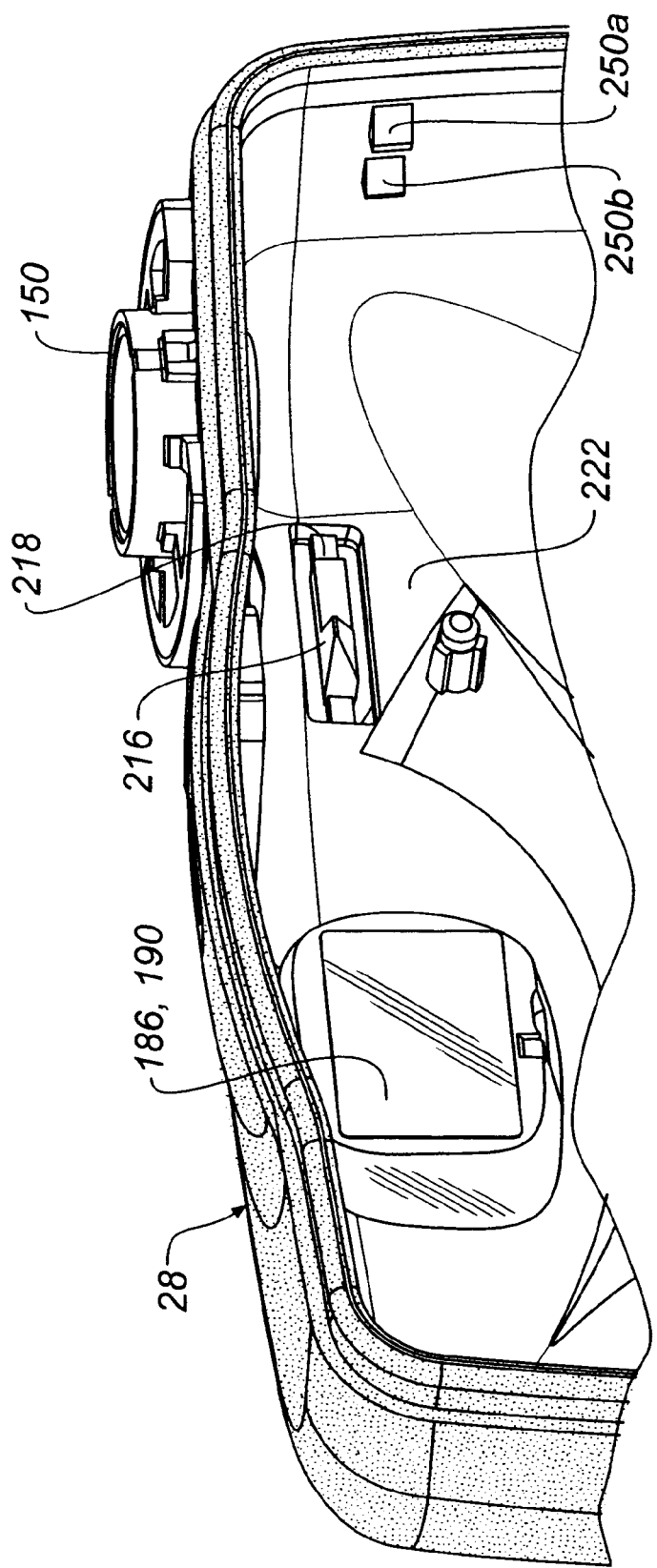
FIG. 22 is a partial rear perspective view of the front housing part of the camera of FIG. 1.
Figure 23:
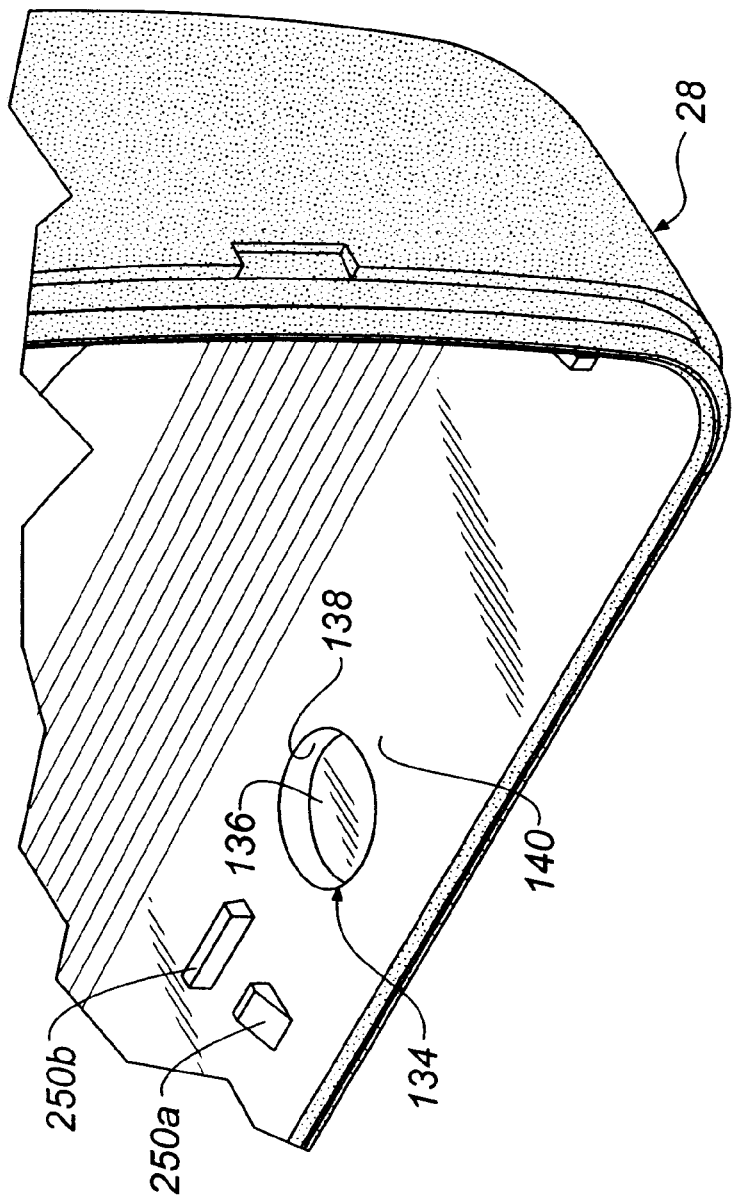
FIG. 23 is a partial enlarged, rear perspective view of the front housing part of the camera of FIG. 1.
Figure 24:
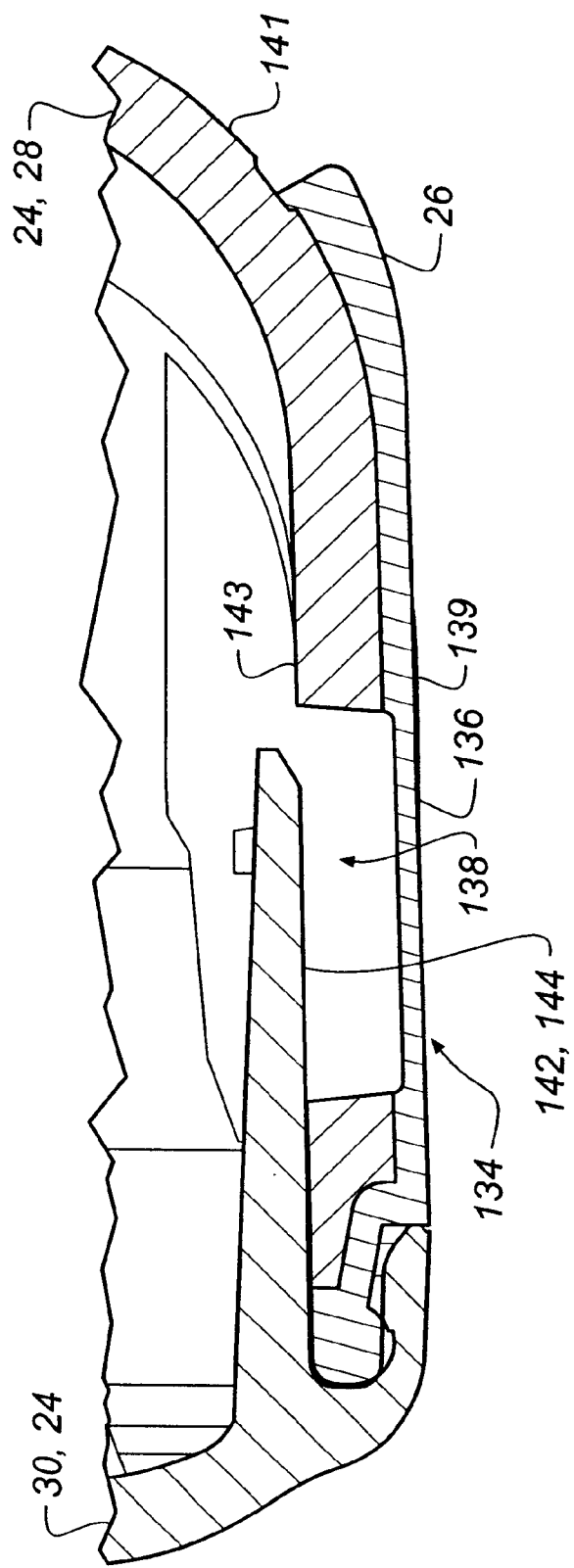
FIG. 24 is a cross-sectional view of the camera of FIG. 1 taken substantially along line 24—24 of FIG. 4. The indicator is undeflected.
Figure 25:
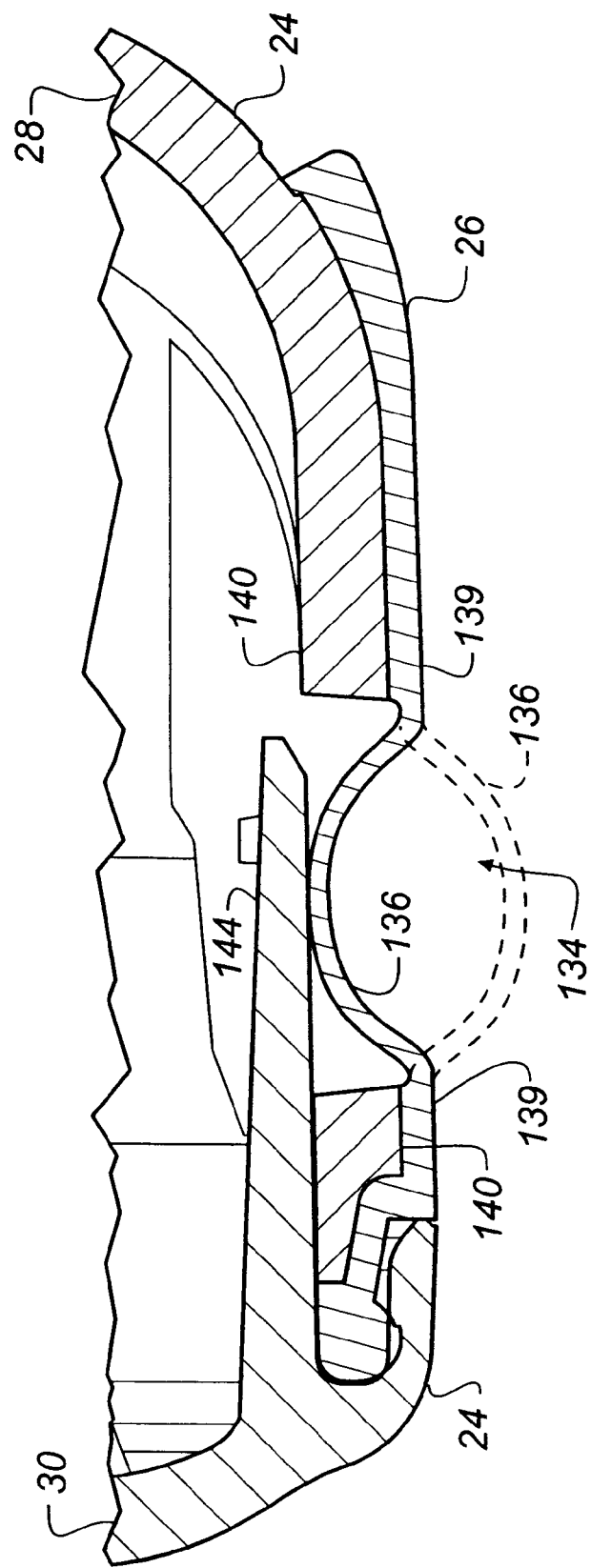
FIG. 25 is the same view as FIG. 24, but the indicator is deflected inward.
Figure 26:
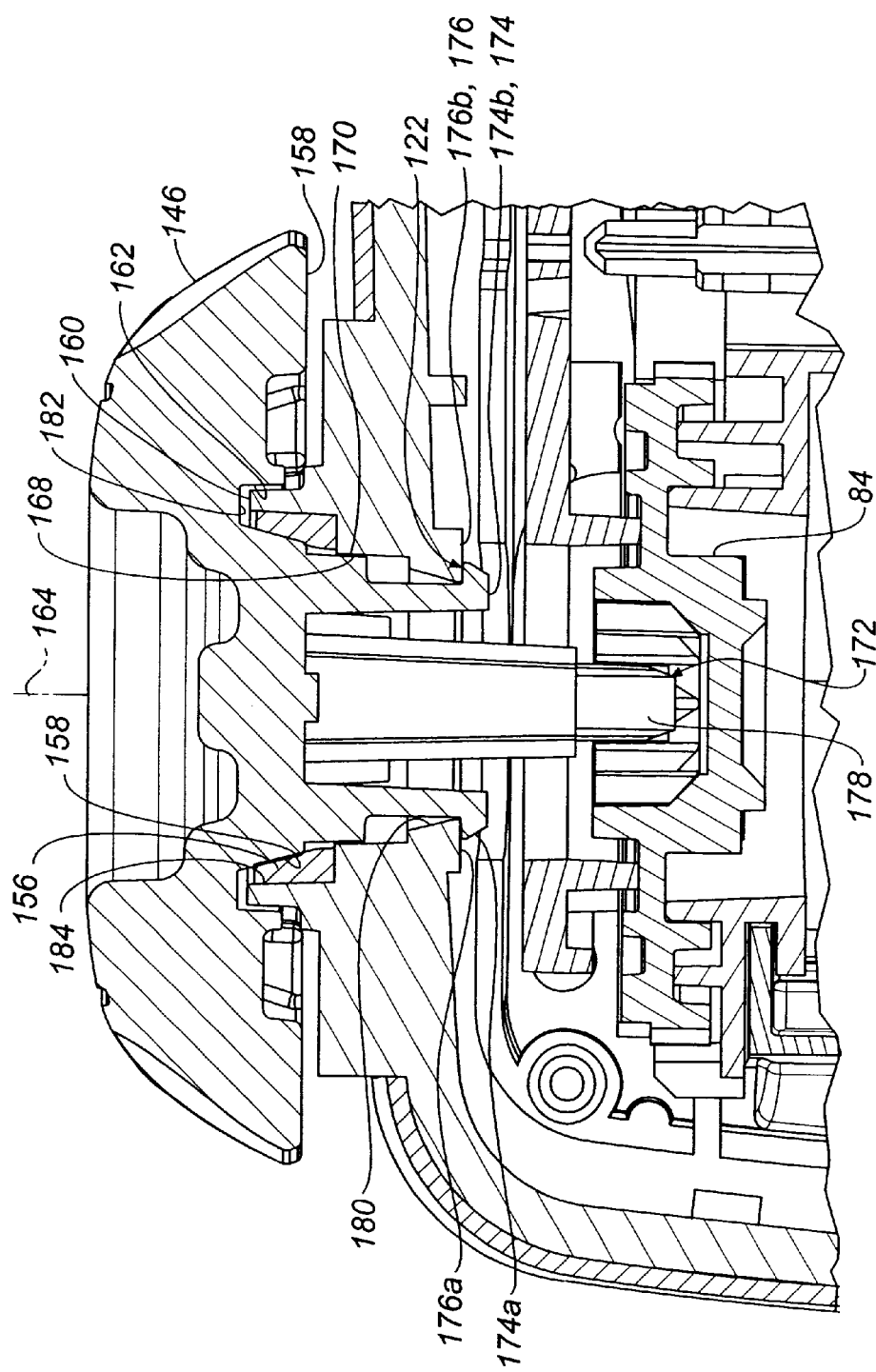
FIG. 26 is a partial cross-sectional view of the camera of FIG. 1 taken substantially along line 26—26 of FIG. 2. The knob is in an initial state.
Figure 27:
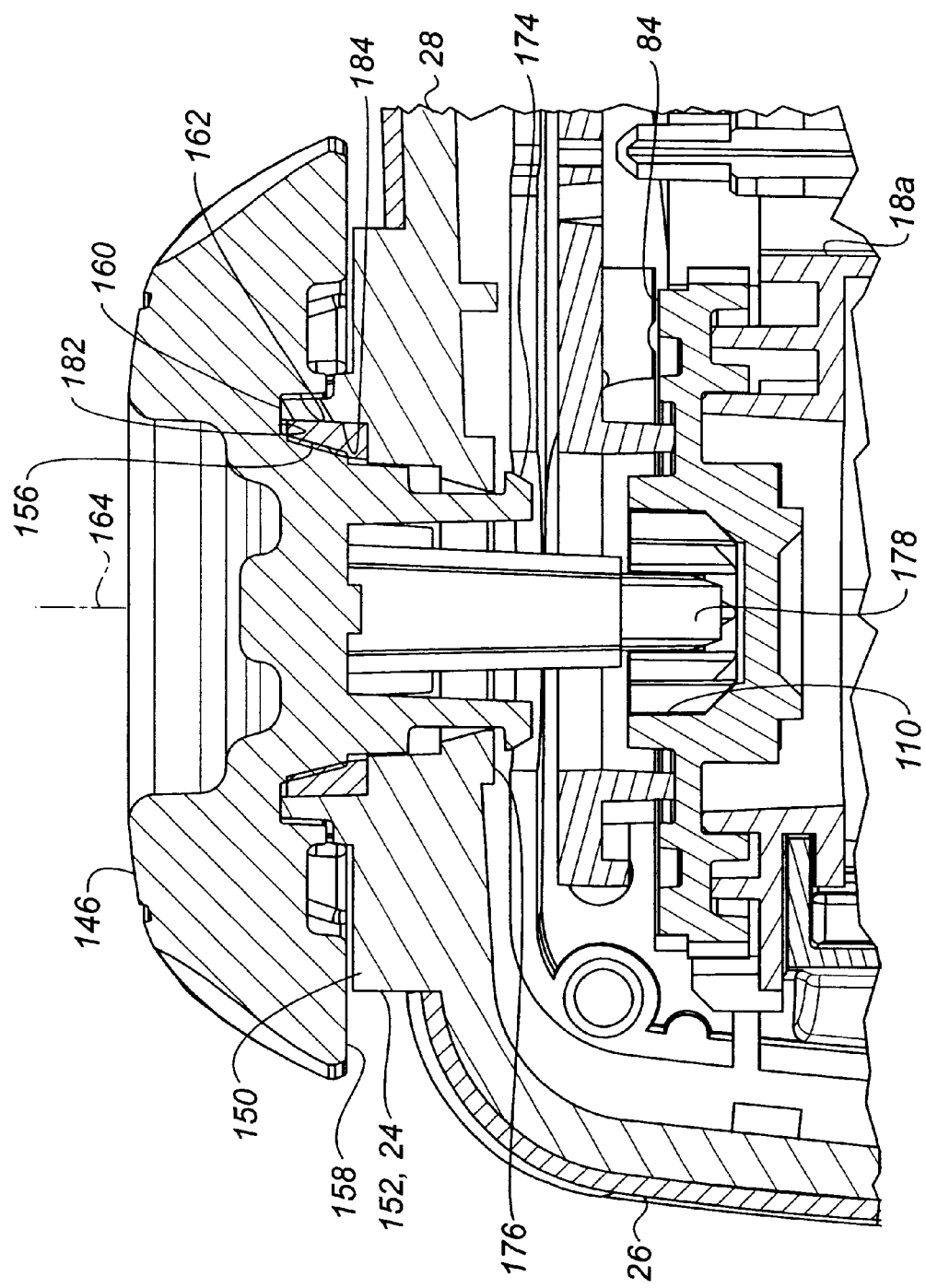
FIG. 27 is the same view as FIG. 26, but the knob is in a fully traveled state.
Figure 29:
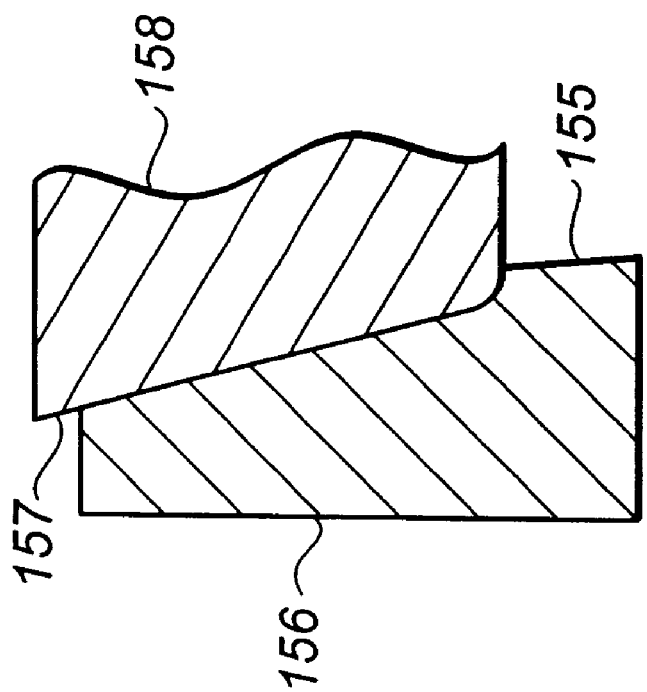
FIG. 29 is the same view as FIG. 28, but with the knob in the fully traveled state of FIG. 27.
Figure 28:
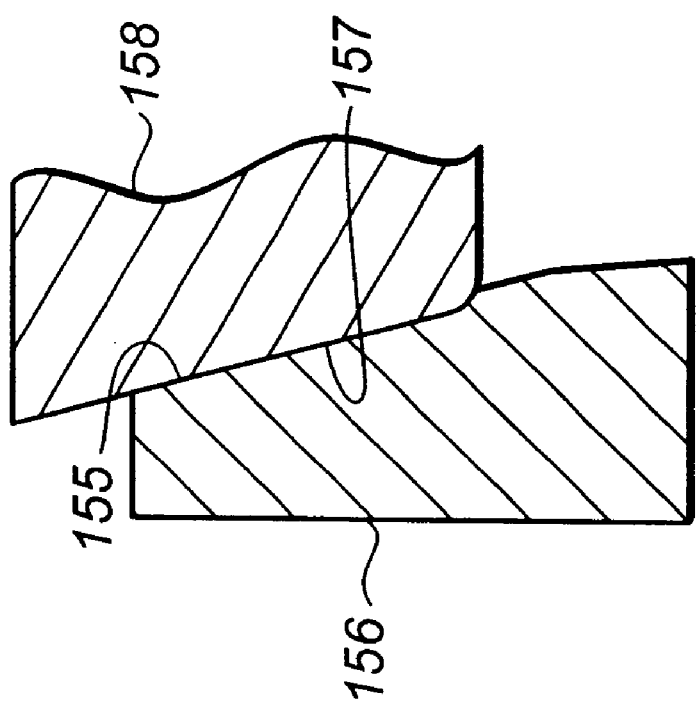
FIG. 28 is a partial semi-diagrammatical cross-section of the seal portion of the knob and the bushing portion of the knob seat of the camera of FIG. 26. The knob is in the initial state.
Figure 30:
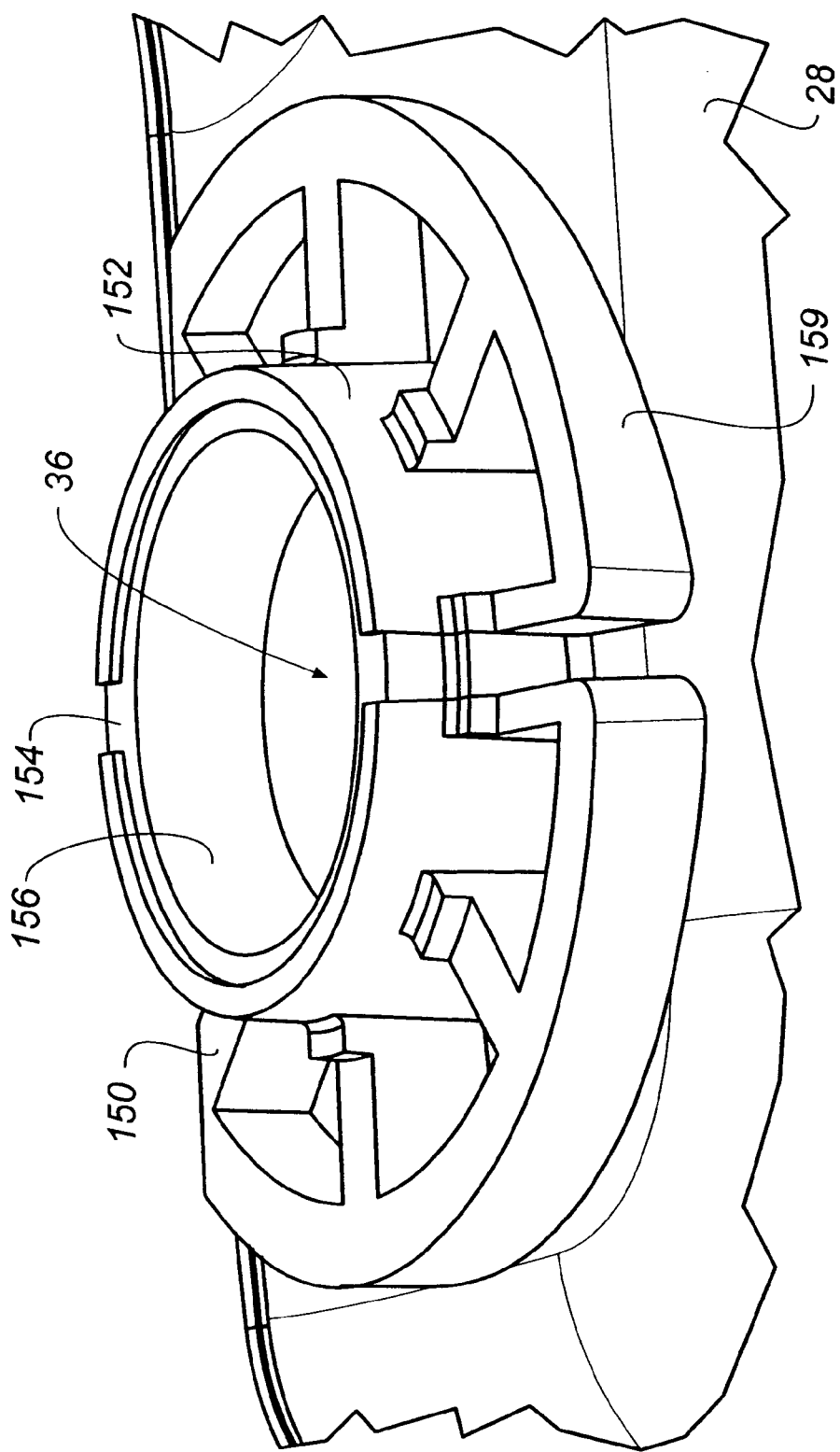
FIG. 30 is a partial, enlarged perspective view of the front housing part of the camera of FIG. 1 showing the knob seat.
Figure 31:
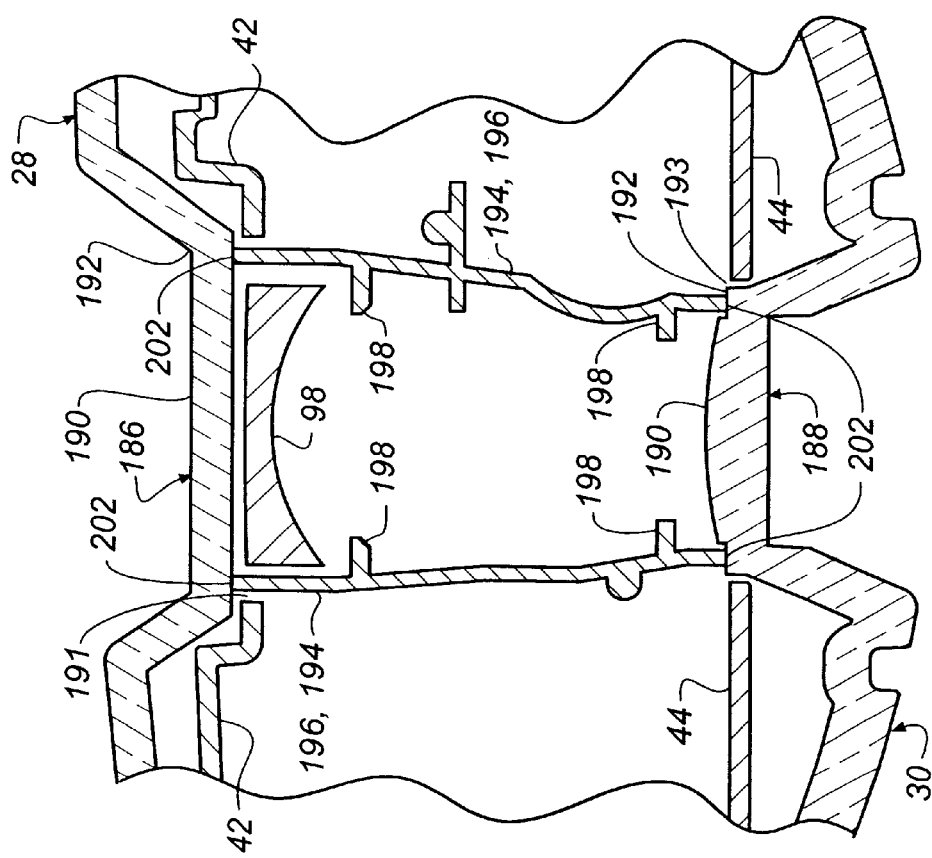
FIG. 31 is a partial cross-sectional view of the camera of FIG. 1 taken substantially along line 31—31 of FIG. 3. The viewfinder tunnel and viewports are shown.

After the film has been exposed, the camera 10 is presented to a processor for photofinishing. The knob 22 is pulled out. The rear housing part 30 is pried open using a screwdriver or like tool (not illustrated). The rear cover 44 is then bent, as shown in FIG. 13 using a screwdriver 251 or the like, at a line of weakness (not shown). The resulting film door 256 is bent open and the film unit 18 is removed.

After the film unit 18 has been removed, the frame assembly 14 remains in the front housing 12, held by retention features 254. The retention features 254 are releasable, but retain the camera frame assembly 14 in place until deliberate efforts are undertaking to separate the camera frame assembly 14 from the front housing part 28. The retention features 254 can be releasable fasteners, including hook-and-eye tapes, or pealable adhesive layers or tapes.

In a particular embodiment of the invention, the frame assembly 14 is held in place by interference between fasteners in the form of lugs 250 of the front cover 42 and catch portions 252 of the filmless camera frame assembly 14. The catch portions are outwardly extending external ledges of the covers. The lugs 250 can be the same ones use for the attachment of the rear housing part 30 to the front cover 42. This is not preferred, because the positioning of the lugs 250 required for the two functions, causes the camera frame assembly 14 to be loosely gripped after the rear cover 44 is removed. This can cause rattling and an incomplete closure between the front housing part 28 and the front cover 42. In a preferred embodiment, a second set of lugs 250 is present on the front housing part 28. The second set of lugs 250*b* are forward of the first set of lugs 250*a* used with the rear housing part 30. The second set of lugs 250*b* hold the camera frame assembly 14 tightly in place against the front housing part 28. This allows better exclusion of contaminants from the front surface 258 of the taking lens.

The camera frame assembly 14 is removed from the front housing part 28 for recycling by flexing the housing 12 part manually or using a prying tool. These procedures can be provided by automatic machinery or, alternatively, manually using simple hand tools.

The invention has been described in detail with particular reference to certain preferred embodiments thereof, but it will be understood that variations and modifications can be effected within the spirit and scope of the invention.

What is claimed is:

1. A photography method comprising the steps of:
   placing a pressure housing of a camera in an enclosure;
   providing a partial vacuum within said enclosure following said placing;
   during said providing, sealing said housing against both air entry and venting;
   maintaining said sealing; and
   during said maintaining, continuously indicating any relative pressure differential between said housing and an environment external to said housing.

2. The method of claim 1 wherein said indicating further comprises showing a first indication when said environment external to said camera is at pressure higher than said camera, showing a second indication when said environment external to said camera is at the same pressure as said camera, and showing a third indication when said environment external to said camera is at a pressure lower than said camera.

3. The method of claim 2 wherein said showing further comprises deflecting of a free region of an elastomer facing inward and outward when said environment external to said camera is at said pressure higher than said camera and at said pressure lower than said camera, respectively.

4. The method of claim 3 further comprising preventing overdeflection of said free region when said environment external to said camera is at said pressure higher than said camera.

5. The method of claim 4 further comprising submerging said camera to a depth of at least 9 meters, during said maintaining.

6. The method of claim 1 further comprising heating said camera to a temperature of up to 49 degrees C., during said maintaining.

7. The method of claim 6 further comprising submerging said camera to a depth of at least 9 meters, during said maintaining.

8. The method of claim 1 further comprising submerging said camera to a depth of at least 9 meters, during said maintaining.

9. The method of claim 1 wherein said assembling includes placing a camera frame assembly in said housing, said camera frame assembly having an unexposed film unit; and said maintaining is until said film unit is fully exposed.

10. A photography method comprising the steps of:
    providing a partial vacuum within a pressure housing of a camera having an unexposed film unit;
    during said providing, sealing said camera against both air entry and venting;
    maintaining said sealing of said camera until said film unit is fully exposed;
    during said maintaining, deflecting a free region of an elastomer facing inward and outward when said environment external to said camera is at a pressure higher than said camera and at a pressure lower than said camera, respectively; and
    preventing overdeflection of said free region when said environment external to said camera is at said pressure higher than said camera.

11. The method of claim 10 further comprising submerging said camera to a depth of at least 9 meters, during said maintaining.

12. A photography method comprising the steps of:
    providing a partial vacuum within a pressure housing of a camera having an unexposed film unit;
    during said providing, seating a winding knob in a passage through said housing;
    during said providing, sealing said camera against both air entry and venting;
    maintaining said sealing of said camera until said film unit is fully exposed;

during said maintaining, continuously indicating any relative pressure differential between said camera and an environment external to said camera.

13. The method of claim 12 further comprising, prior to said providing, sealing front and back housing parts of said housing together.

14. The method of claim 12 further comprising, prior to said seating, placing said housing and said winding knob in an enclosure and closing said enclosure; and wherein said providing a partial vacuum step further comprises partially evacuating said enclosure.

15. The method of claim 12 wherein said partial vacuum is air at a pressure of 59 Kpa at room temperature.

16. A photography method comprising the steps of:
providing a partial vacuum within a pressure housing of a camera;
during said providing, sealing said housing against both air entry and venting;
maintaining said sealing of said camera;
submerging said camera to a depth of at least 9 meters, during said maintaining;
during said maintaining, continuously indicating any relative pressure differential between said camera and an environment external to said camera.

17. The method of claim 16 wherein said partial vacuum is air at a pressure of 59 Kpa at room temperature.

18. The method of claim 16 further comprising heating said camera to a temperature of up to 49 degrees C., during said maintaining.

19. A photography method comprising the steps of:
providing a partial vacuum within a pressure housing of a camera;
during said providing, seating a winding knob in a passage through said housing;
during said providing, sealing said housing against both air entry and venting;
maintaining said sealing of said camera;
heating said camera to a temperature of up to 49 degrees C., during said maintaining;
submerging said camera to a depth of at least 9 meters, during said maintaining;
during said maintaining, continuously indicating any relative pressure differential between said camera and an environment external to said camera.

20. An underwater camera comprising
a housing defining an internal cavity, said housing having an engineering plastic shell and an elastomer facing united with a surface of said shell, said housing sealing said internal cavity water-tightly from an external environment, said internal cavity having an unsubmerged internal pressure, at room temperature, less than air pressure at sea level;
a camera frame assembly disposed in said internal cavity; and
a seal integrity indicator mounted to said housing, said seal integrity indicator having a first state when said internal pressure is less than external pressure and a second state when said internal pressure is equal to external pressure.

21. The camera of claim 20 wherein said internal pressure is less than 101 Kpa when said camera is at a temperature of 49 degrees C.

22. The camera of claim 21 wherein said internal pressure is 59 Kpa at room temperature.

23. The camera of claim 20 wherein said internal pressure is 59 Kpa at room temperature.

24. The camera of claim 20 wherein said camera frame assembly includes a film unit having a prewound film roll.

25. The method of claim 20 wherein said shell and said facing are codiffused.

* * * * *